United States Patent
Agrawal et al.

(10) Patent No.: US 10,571,772 B2
(45) Date of Patent: Feb. 25, 2020

(54) ADDED FEATURE ELECTROOPTICAL DEVICES AND AUTOMOTIVE COMPONENTS

(75) Inventors: Anoop Agrawal, Tucson, AZ (US); Juan Carlos L Tonazzi, Tucson, AZ (US); John P. Cronin, Tucson, AZ (US)

(73) Assignee: Ajjer, LLC, Tucson, AZ (US)

( * ) Notice: Subject to any disclaimer, the term of this patent is extended or adjusted under 35 U.S.C. 154(b) by 0 days.

(21) Appl. No.: 13/348,555

(22) Filed: Jan. 11, 2012

(65) Prior Publication Data

US 2013/0128333 A1 May 23, 2013

Related U.S. Application Data

(60) Provisional application No. 61/431,567, filed on Jan. 11, 2011, provisional application No. 61/481,172, filed on Apr. 30, 2011.

(51) Int. Cl.
*G02F 1/157* (2006.01)
*G02F 1/161* (2006.01)

(52) U.S. Cl.
CPC ............ *G02F 1/157* (2013.01); *G02F 1/161* (2013.01)

(58) Field of Classification Search
CPC ........ G02F 1/15; G02F 1/1502; G02F 1/1515; G02F 1/1519; G02F 1/1523; G02F 1/1525; G02F 1/153; G02F 1/1533; G02F 1/1536; G02F 1/1506; G02F 1/161; G02F 1/157; G02F 1/508; C09K 9/02
USPC .................... 359/270, 272–274, 265, 267
See application file for complete search history.

(56) References Cited

U.S. PATENT DOCUMENTS

| | | | |
|---|---|---|---|
| 2,963,378 A | | 12/1960 | Palmquist |
| 4,129,861 A | * | 12/1978 | Giglia ............... G09G 3/19 345/49 |
| 4,187,332 A | | 2/1980 | Fouche |
| 4,799,768 A | | 1/1989 | Gahan |
| 4,882,565 A | | 11/1989 | Gallmeyer |
| 5,011,751 A | * | 4/1991 | Yoneyama ........ C08G 61/123 429/247 |
| 5,140,455 A | | 8/1992 | Varaprased |
| 5,189,537 A | | 2/1993 | O'Farrell |

(Continued)

FOREIGN PATENT DOCUMENTS

WO  WO 2009099900 A2 *  8/2009  .......... B60R 1/088

OTHER PUBLICATIONS

Material safety data sheet, 3M, Z-light spheres, 3M, Oct. 2001, pp. 1-2.*

(Continued)

*Primary Examiner* — Marin Pichler
(74) *Attorney, Agent, or Firm* — Rothwell, Figg, Ernst & Manbeck, P.C.

(57) ABSTRACT

This invention focuses on electrooptic devices and in particular on electrochromic (EC) devices with many aspects directed towards automotive EC mirrors. This invention improves the visual impact of such devices by employing modifications to the materials and layers so that their refractive index can be changed and/or matched to get this improvement. In addition this also discloses use of in-molded electronic components to reduce the assembly cost of these devices and improve their reliability. Displays can be incorporated in EC mirrors while having reflective coatings on the fourth surface.

4 Claims, 10 Drawing Sheets

(56) References Cited

U.S. PATENT DOCUMENTS

| | | | |
|---|---|---|---|
| 5,239,405 | A | 8/1993 | Varaprasad |
| 5,355,284 | A | 10/1994 | Roberts |
| 5,682,267 | A | 10/1997 | Tonar |
| 5,689,370 | A | 11/1997 | Tonar |
| 5,724,187 | A | 3/1998 | Varaprased |
| 5,856,211 | A | 1/1999 | Tonazzi |
| 5,910,854 | A | 6/1999 | Varaprased |
| 5,981,113 | A | 11/1999 | Christian |
| 6,111,683 | A | 8/2000 | Cammenga |
| 6,219,253 | B1 | 4/2001 | Green |
| 6,244,716 | B1 | 6/2001 | Steenwyk |
| 6,449,082 | B1 | 9/2002 | Agrawal |
| 6,614,579 | B2 | 9/2003 | Roberts |
| 6,657,767 | B2 | 12/2003 | Bonardi |
| 6,995,891 | B2 | 2/2006 | Agrawal |
| 7,004,592 | B2 | 2/2006 | Varaprasad |
| 7,175,901 | B1 | 2/2007 | Sagar |
| 7,202,987 | B2 | 4/2007 | Varaprasad |
| 7,287,868 | B2 | 10/2007 | Carter |
| 7,300,166 | B2 | 11/2007 | Agrawal |
| 7,334,922 | B2 | 2/2008 | Bonardi |
| 7,382,636 | B2 | 6/2008 | Barrman |
| 7,471,438 | B2 | 12/2008 | McCabe |
| 7,643,200 | B2 | 1/2010 | Varaprasad |
| 7,651,228 | B2 | 1/2010 | Skiver |
| 7,663,798 | B2 | 2/2010 | Tonar |
| 7,667,579 | B2 | 2/2010 | DeLine |
| 7,668,495 | B2 | 3/2010 | Tonar |
| 7,684,103 | B2 | 3/2010 | Ash |
| 7,706,046 | B2 | 4/2010 | Bauer |
| 7,718,096 | B2 | 5/2010 | Yale |
| 7,733,555 | B2 | 6/2010 | Agrawal |
| 7,738,155 | B2 | 6/2010 | Agrawal |
| 7,746,534 | B2 | 6/2010 | Tonar |
| 7,772,966 | B2 | 8/2010 | Turnbull |
| 7,832,882 | B2 | 11/2010 | Weller |
| 7,859,738 | B2 | 12/2010 | Baur |
| 7,906,756 | B2 | 3/2011 | Drummond |
| 2002/0041443 | A1* | 4/2002 | Varaprasad et al. ........ 359/603 |
| 2004/0233537 | A1* | 11/2004 | Agrawal et al. ........... 359/604 |
| 2005/0007645 | A1* | 1/2005 | Tonar ............... B60Q 1/2665 359/265 |
| 2005/0194454 | A1 | 9/2005 | Ferber et al. |
| 2005/0231879 | A1 | 10/2005 | Gentile |
| 2007/0070489 | A1* | 3/2007 | Verhaegh ............ G02F 1/172 359/265 |
| 2007/0191074 | A1 | 8/2007 | Iwasaki |
| 2007/0222542 | A1 | 9/2007 | Joannopoulos |
| 2008/0074724 | A1* | 3/2008 | Agrawal et al. ........... 359/265 |
| 2008/0202912 | A1 | 8/2008 | Boddie |
| 2009/0002803 | A1* | 1/2009 | Tonar ................ G02F 1/161 359/273 |
| 2009/0027756 | A1 | 1/2009 | Ash |
| 2009/0108985 | A1 | 1/2009 | Ash |
| 2009/0095408 | A1 | 4/2009 | LeCompte |
| 2009/0116097 | A1 | 5/2009 | McCabe |
| 2010/0073754 | A1 | 3/2010 | Baumann |
| 2010/0126030 | A1 | 5/2010 | Weller |
| 2010/0182114 | A1 | 7/2010 | Huang |
| 2010/0321758 | A1 | 12/2010 | Bugno |
| 2011/0002028 | A1 | 1/2011 | Luten |
| 2011/0051219 | A1 | 3/2011 | Agrawal |
| 2011/0148218 | A1 | 6/2011 | Rozbicki |

OTHER PUBLICATIONS

3M Material safety data sheet, 3M, Scotchlite brand glass bubbles, 3M, Nov. 27, 2002, p. 1.*

Safety data sheet, Zeeosphere Ceraminc Microspheres, Zeeospheres Ceramics LLC, Mar. 25, 2015, p. 1.*

Ryu et al. "Novel Electrochromic Displays Using Monodisperse Viologen-Modified Porous Polymeric Microspheres" Jul. 24, 2006 Macromolecular Rapid Communications, vol. 27, 2006, pp. 1156-1161 (Year: 2006).*

Balsara et al., "Micelle Formation of BAB Triblock Copolymers in Solvents That Preferentially Dissolve the A Block", Macromolecules, 1991, 24, pp. 1975-1986.

3M, "Product Information—3M™ Glass Bubbles—K Series-S Series", (2007). (4 pages).

Anheier, et al, FY 2008 Miniature Spherical Retroreflectors—Final Report, Pacific Northwest National Laboratory, Report No. PNNL-18344 (2009).

ASTM test method E2240.

ASTM test method E2241.

Frankel, G.S., et al., J. of Electrochemical Society, vol. 136, (1989) p. 1243 to 1244.

King et al, report SAND-97-1183C from Sandia National Laboratory, Albuquerque, NM, 1997.

Lampert C.L., et al., Durability Evaluation of Electrochromic Devices—an Industry Perspective, Solar Energy Materials and Solar Cells, 56 (1999) p. 449 to 463.

Liu, J.G. et al, J. of Materials Chemistry, vol. 19, p. 8907-8919, (2009).

Lynam, N.R., Agrawal, A., Automotive Applications of Chromogenic Materials (pp. 46-84) in "Large Area Chromogenics: Materials and Devices for Transmittance Control", edited by Lampert, C.M., Granqvist, C.G., SPIE Optical Engineering Press, Bellingham, Washington, USA (1990).

Setlur, et al. The Electrochemical Society Interface, Winter (2009) p. 32 to 36.

Srivastava, et al, The Electrochemical Society Interface, Summer (1998) p. 28 to 31.

Directive for RoHS which was adopted by the European Union in 2006.

SAEJ1960 test method.

Energy Harvesting Forum (www.energyharvesting.net).

* cited by examiner

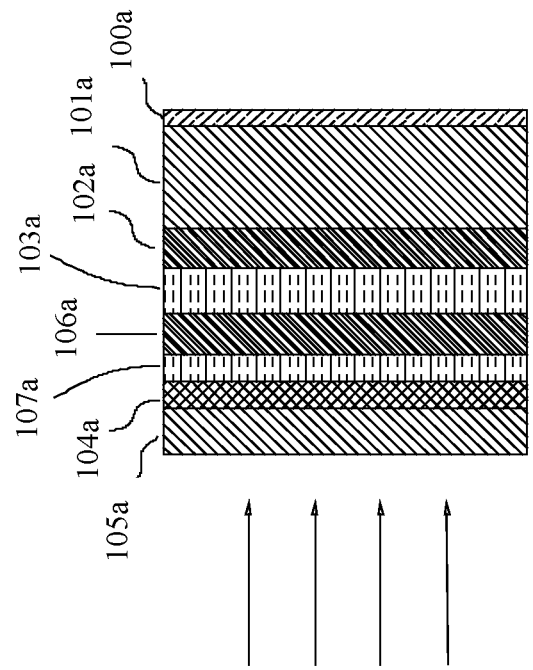
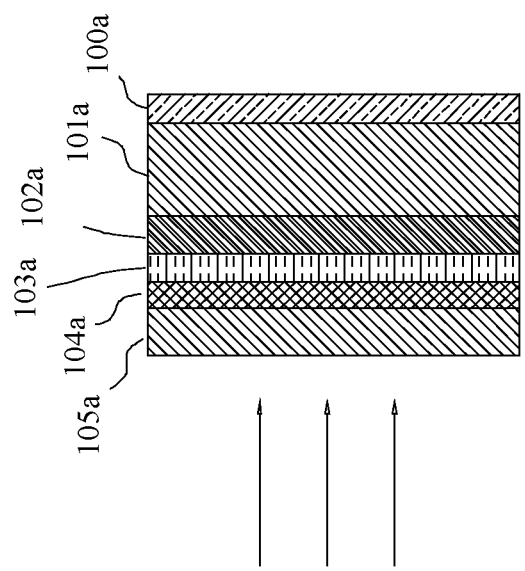
Figure 10b
Figure 10a

ADDED FEATURE ELECTROOPTICAL DEVICES AND AUTOMOTIVE COMPONENTS

RELATED APPLICATION/CLAIM OF PRIORITY

This application is related to and claims priority to the U.S. provisional application entitled "Improved and added feature Electrooptic Devices", Ser. No. 61/431,567, filed on Jan. 11, 2011, and U.S. provisional application Ser. No. 61/481,172 filed on Apr. 30, 2011, which are incorporated herein by reference.

TECHNICAL FIELD

This invention is relates to the field of electrooptic (EO) devices particularly those EO devices which are electrochromic (EC). The application of these devices are in displays, windows, and variable reflectivity automotive mirrors and mirrors for other applications. In particular this relates to the optical characteristics of the materials used in construction of such devices and also low cost automotive mirrors. In addition this invention also discloses insignias that can be incorporated in automotive components such as electrochromic mirrors to enhance their utility. This innovation also discloses electrochromic and other automotive mirrors with electrical features, wherein the electrical power to drive these is derived from an energy generater/harvester located within the mirror housing.

BACKGROUND OF THE INVENTION

Electrochromic (EC) devices are being increasingly used for self dimming automotive mirrors and have been suggested for many different applications. Many of these devices are made by introducing a fluid between a cavity formed by perimeter bonding of two spaced apart substrates. The substrates are largely coplanar, i.e., the gap between the two substrates is uniform, even if the device (and the substrates) has curvature. The substrate surfaces facing inside the cavity are coated with conductive coatings. This fluid may remain as a liquid in the finished device or it is solidified after the cavity has been filled. In electrooptical devices including electrochromic devices, at least one electrically conductive coating is deposited on both the substrates, and at least one of which is transparent. Additional coatings may be deposited depending on the nature of construction and the device properties required. The perimeter sealant has one or more holes (or the substrates has one or more holes) through which the fluid (which forms the electrolyte in an EC device) is introduced and then these hole(s) are plugged (or sealed). The empty cavities with sealed perimeter are first prepared, and in a later step the fluid is introduced to fill the cavity. The introduction of the fluid is typically done by vacuum backfilling (e.g., see U.S. Pat. No. 5,140,455) or by an injection process (see U.S. Pat. No. 5,856,211 and published U.S. patent application 20090095408). The uniform gap between the two substrates is controlled by incorporating spacer beads in the perimeter sealant. However, this method does not work too well if the surface area of the device increases, as depending on the substrate rigidity the substrates may sag towards the center of the device and reduce the gap. It is then preferred that some spacers be added within the cavity to avoid this issue. In addition, in some curved devices, introducing spacer beads in the gap also helps in maintaining uniform spacing between the two substrates. These spacers are typically spherical or near spherical beads. These spacers interfere with clear vision as typically their refractive index (RI) is not the same as that of the electrolyte. One of the objectives is to disclose materials and schemes to make spacers and electrolytes with specific optical properties to overcome this problem.

If the RI of the material in the gap (e.g., the electrolyte layer in an electrochromic device) and the spacer material is not matched, then these spacers are visible and can be objectionable to a viewer. Matching means RI of the two materials to be within 0.05 RI units and more preferably within 0.002 RI units or better. In addition, unless mentioned otherwise RI in this disclosure refers to the real part of the refractive index in case complex RI notation is used. This becomes more of a problem with increasing gap, i.e., with larger spacers. The commercial EC automotive mirror devices have at least one electrochromic dye in the electrolyte and are self bleaching, i.e., when the power to color these devices is removed, they self bleach over a period of time. In such devices, for a given electrolyte composition, one has to usually increase the cell gap (or the conductivity of the conductive electrodes) with increasing device size so that the cell colors uniformly all over the area. This increase in gap reduces the self bleach reaction (also called back reaction), and ensures that the resistive potential drop from the edges (where highly conductive busbars are located) to the center of the device is small. It is the potential on the electrodes across the cell gap that controls the level of coloration. Furthermore, many of the EC mirrors use increasing cell gap with increasing mirror size (e.g., exterior automotive mirrors), where such spacers increase in visibility. This is also true for windows which are large in area, and windows using this type of construction are now being used for aircrafts. As an example glass spacers have an average refractive index (RI) of about 1.52 in the visible spectrum. Many devices using mainly propylene carbonate will have the electrolyte RI of about 1.42.

Many of the EC mirrors are now integrated with displays. These displays are assembled on the rear of the back substrate, and these are viewed from the front side. The mirror coating (typically on the third surface) is partially transmissive to allow these displays to be seen when these are powered. When the spacing between the substrates is large and spacers are used within the cavity, such spacers in the EC cells may interfere with the clarity of these displays as they scatter light due to the mismatch of their RI to that of the electrolyte. Active displays are typically provided in EC mirrors for conveying additional information (U.S. Pat. No. 4,882,565). Active displays in this context are those which are either capable of changing the information being displayed or they may be turned-off or turned-on. These displays may be in the mirror casing or in the mirror area. In interior mirrors the display may provide information on direction where the vehicle is headed (compass), amount of gas remaining, tire pressure, inside and/or outside temperature, internet communicated information, any warning or status signals such as open door, safety bag, videos of the rear interior car cabin, videos of rear vision while backing, taxi fare, etc. The displays in the outside mirror may provide blind spot information for the driver, or the turn signals for those cars in the vicinity of the vehicle without distracting the driver, directions from a GPS system and so forth.

Another novel way of incorporating partially transmissive reflectors is disclosed in this invention. This is done by using reflective coatings which are partially transmissive on the fourth surface, which is then combined with a protective polymeric coating which is transparent rather than the opaque paint that has been typically used to protect the fourth surface reflective coatings.

Thus, there is a preference from the automakers to reduce the optical distraction from these spacers in such mirrors. One of the method that has been suggested is to incorporate spacers within the cavity to hold a uniform gap when the cavity is formed, and as the cavity is filled with the fluid, the spacers can dissolve in this fluidic medium. Such methods are well described in U.S. Pat. Nos. 5,910,854, 7,643,200, 7,684,103, published U.S. patent application 20090027756. All of these patents and applications are incorporated herein by reference. U.S. Pat. Nos. 5,910,854 and 7,643,200 describe the use of plastic or polymeric spacers that can be dissolved in the electrolytic fluid, and the others describe making spacers of soluble materials such as salts, electrochromic dyes and UV stabilizers. When spacers dissolve and the substrate rigidity is low, then it is easy to push the substrate towards the center of the device where the top substrate deforms and is pushed closer to the rear substrate thus decreasing the electrolyte gap locally and in the extreme case may even touch the rear substrate and result in shorting. This could be done with relatively low force if a user is trying to clean the device. Thus spacers in the active area are preferred when there is a possibility of this happening to improve the mechanical stability of the cell.

Further, when one has the ability to change and match the RI of the electrolyte to the other materials then it leads to additional benefits. For example, it is preferred that the EC devices in the dark state have low reflectivity, however, one of the reasons for increased reflectivity is the RI mismatch of the substrate and the other layers in the device. For EC mirrors, matching of the electrolyte layer RI to that of the front substrate along with judicious choice of the transparent conductor coating properties and thickness on this substrate leads to low reflectivity, which is also another objective of this invention. Permanent indicators or markings or indicia on the mirrors have been traditionally etched, e.g., "Objects are closer than they appear on the mirror" or "Heated" on convex mirrors. Since many of these were first surface chrome mirrors this etching was done by removing chrome. There are patents on how these are incorporated into EC mirrors. For example U.S. Pat. Nos. 5,682,267; 5,689,370 and 5,189,537. U.S. Pat. No. 5,189,537 describes that this may be formed by depositing a dielectric layer on one of the inwardly facing transparent conductors. This blocks out the EC activity in the local area, thus making the markings visible when the device colors. U.S. Pat. No. 5,682,267 describes that this may be done by etching one of the interior facing surfaces before depositing the transparent conductor. This causes the reflection change in the area of etch. U.S. Pat. Nos. 5,689,370 and 7,859,738 describe another method where a reflective conductor is deposited on one of the conductive surfaces facing the interior of the EC cavity. U.S. Pat. No. 7,738,155 describes use of conductive materials to be deposited on the transparent conductor which is deposited on the second surface. All these methods may be used for devices of this invention, which means with porous spacers or those displays and/or insignias which are described in the present invention.

Automotive mirrors are an important safety item, first these mirrors reduce the driver's distraction caused by manually adjusting the mirror to reduce glare, and also reducing any optical impairment where both of these can add significant time before a driver can react to an emergency situation. However, these mirrors are expensive and even after 20 years of their introduction these are only found in about 20% of the automobiles. Thus it would be desirable to reduce their cost to extend this benefit to a larger number of automobiles. Part of this cost arises from the electronics to control, power and provide better user interfaces for mirrors, and this innovation also addresses the ways such cost can be reduced by integrating many of the electronic components in the mirror case (which includes bezels) which are used to house the EC mirror element.

One issue with all of these passive indicators (e.g., insignias) is that either they have good visibility in the daytime (when the mirror is bleached and the ambient conditions are bright), or at night when the mirror is colored and the visibility is enhanced by a differential reflectivity or absorption when illuminated by another vehicle or another source. Those indices are desirable that can be seen in nighttime and during the daytime under multiple illumination or ambient conditions and whether the electrochromic mirror (only if it is an electrochromic mirror) is bleached or dark. Further in many situations it is desirable that these be observed not just by the driver of the car which has this insignia, but preferably by those people who are in the vicinity, such as drivers and passengers of other cars nearby. As discussed in detail such attributes can be imparted by incorporating insignias which use retroreflective properties and/or use luminescent materials.

Electrochromic mirrors in automobiles are typically hard wired to the power system of an automobile. In order to reduce the cabling complexity and cost especially for retrofit applications, it is desirable to provide power to these mirrors which does not require these cables.

SUMMARY OF INVENTION

Many electrooptical devices are made using two substrates which are assembled together by sealing at the perimeter. In several of these devices, the gap between the two substrates is controlled by introducing a sprinkling of spacers to maintain this gap, and this gap is then subsequently filled with a fluid. An objective of this invention is to disclose methods and materials to reduce or eliminate the spacer visibility in electrooptical devices. In the first method porous spacers are used through which the electrolyte or the fluid medium used between the substrates can permeate so that these become largely invisible. Porous spacers may also be used in the perimeter sealant which also provides specific advantages as discussed later. The second method comprises of using solid spacers which match the refractive index of the electrolyte or the fluid medium between the substrates. This matching is done by either changing the RI of the solid spacers or of the electrolyte/medium or changing both. The second method may also be used in conjunction with the first method, i.e., in the second method, porous spacers are used, where its material of construction matches the RI of the electrolyte. Another objective of this invention is to demonstrate that by changing the RI of the electrolyte one can also eliminate the undesirable reflectivity from the various interfaces of the device. Yet another objective is to enhance the quality of the displays and indicators that are associated with these electrooptic devices. Another objective is using fourth surface reflectors which may be partially transmissive so as to be able to position the display behind the reflector. Yet another objective is to be able to lower the integration cost of the automotive mirrors and other EC devices by integrating electronic components within cases (housing) used for these devices. Another objective is to incorporate insignia in automotive mirrors including electrochromic mirrors, and other automotive components which have retroreflective and/or luminescent properties. Yet another objective is to enable electrochromic and other automotive mirrors with electrical features, wherein the electrical power to drive these is derived from an energy generator/harvester located within the mirror housing.

BRIEF DESCRIPTION OF DRAWINGS

FIGS. 10a,b show schematics of the cross-section of the rear substrate of an EC mirror with various coatings and display attachment;

DETAILED DESCRIPTION OF THE INVENTION

Figure 1:
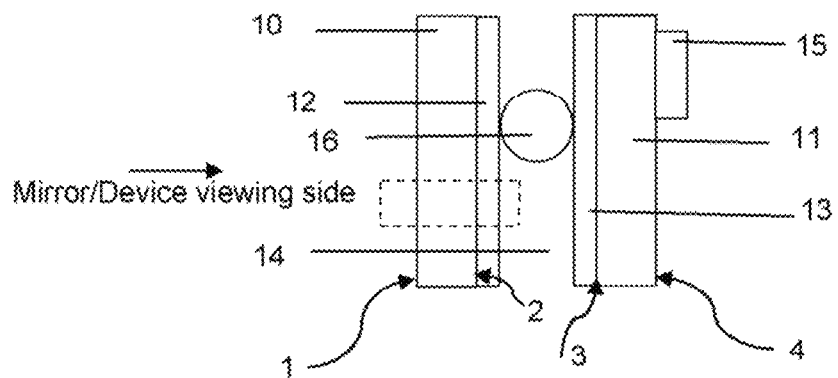
FIG. 1: Schematics of an electrooptical device formed using two substrates.

Spacers and Electrolyte Characteristics to Reduce Optical Distortion in EC Devices FIG. 1 shows schematics of an electrooptical device. This could be a liquid crystal device or an electrochromic device. This may be an electrochromic mirror or a transmissive device such as an optical filter or a window. The device comprises of two substrates 10 and 11. These substrates are coated with conductive coatings 12 and 13 respectively, at least one of which is optically transparent for viewing. For a mirror, e.g., an automotive rearview mirror, the substrate with the reflective coating is the rear substrate which is this case is 11 as the mirror is viewed from the front substrate, i.e., 10 which is transparent including the conductive coating. There may be additional coatings including redox layers inserted between the electrolyte and the electronic conducting coatings, but these are not shown. In this case the substrate 10 and the coating 12 are transparent. These coated substrates are spaced apart to form a chamber, and the space between them is filled by the electrolyte layer or the medium 14. This electrolyte may also be considered an electrochromic medium in case it comprises of dyes (electrochromic dyes) that change color when a voltage applied across the conductive coatings 12 and 13. The perimeter of the device is sealed, and this sealant is not shown. Also as the device area increases and/or the substrate rigidity decreases, one may incorporate optional spacers within the viewing area of the device (or in the electrolyte layer of an EC device) as shown by 16 (only one spacer is shown but a typical device comprises of many of these). The perimeter sealant typically comprises of spacers. The size of the spacers in the perimeter sealant may be same as in the electrolyte or this may be different. In some cases there may be a benefit if the perimeter sealant spacer has a different size as compared to the spacer in the electrolyte, and this size difference may be up to 25% and may be larger or smaller. Sometimes spacers in the electrolyte are deposited (e.g., sprayed) from a dilute solution of polymer on one of the coated substrates (preferably not coating the perimeter area where the perimeter sealant and the electrical connections are made), so that they just provide enough tack to the substrate so that they are held in place until the two substrates are assembled. This keeps the spacers from not moving and assembling in one place, which is a more pressing issue when spherical spacers are used with curved substrates. The polymer used to provide this tackiness is preferably the same that is used in the electrolyte and has low molecular weight (less than 100,000, preferably less than 20,000 in molecular weight) so that it offers just enough tack to keep the spacers in place, but solubilizes rapidly in the electrolyte. One may also incorporate a display 15 in such a device. In order to see the display from the viewing side in addition to one of the transparent conductive coating (on the front substrate), the other conductive coating has to be at least partially transmissive. Also shown are four surfaces of the two substrates labeled as 1, 2, 3 and 4. Typically these are labeled starting from the viewing side for mirrors, similarly from the primary side the windows are viewed from (e.g., from inside the cabin of a vehicle or a building). According to this convention the substrate surfaces 2 and 3 have the conductive coatings. In addition, starting from the viewing side, substrate 10 and 11 are respectively called the front and the rear substrates. For windows, both of the conductive coatings are transparent (e.g. ceramic materials that may be used for these coatings are indium tin oxide (ITO), fluorine doped tin oxide (FTO, e.g. TEC 15 glass from Pilkington, Toledo, Ohio), aluminum doped zinc oxide (AZO) and combinations of thin metal coatings with other dielectric and transparent conductive ceramic coatings). Typical surface resistivity of the conductive transparent coatings on the optically transparent substrate for EC devices is in the range of about 6 to 50 ohms/square. For $3^{rd}$ surface mirrors usually the coating on the third surface is reflective, or for $4^{th}$ surface mirrors, coating 13 is transparent and a reflective coating is deposited on the $4^{th}$ surface (not shown). In fourth surface mirrors the mirror coating for interior mirrors is silver, which is generally protected by copper layer to reduce galvanic corrosion and is then followed by an opaque polymeric paint. The mirror device may optionally have an antireflective coating on the first surface (not shown), and the window may also have optional antireflective coatings on $1^{st}$ and $4^{th}$ surfaces (not shown). All of the above described coatings may be single layers or multiple layers to provide additional features, such as abrasion resistance, corrosion/environmental resistance, electrochemical stability, anti-iridescence, optical path-length, wetting by water (hydrophilic or hydrophobic), color or any other physical, electrical, chemical and mechanical properties. For mirrors, particularly for the third surface mirrors the conductive reflectors comprise of more than one coating and/or coatings that have nanosized grains of metal alloys, these are well described in U.S. Pat. Nos. 7,746,534; 7,663,798; 7,667,579; published U.S. patent applications 20100182143; 20100126030, U.S. patent application Ser. No. 12/816,094 filed on Jun. 15, 2010, all which are included herein by reference. Multi-stack coatings for $3^{rd}$ surface include a stack comprising of chromium or titanium, followed by silver, aluminum, ruthenium, rhodium and their alloys, including some specific alloys such as W—Ni, Ni—Mo, Co—W, Ni—P, Ni—W—B, Fe—P, Co—Mo, Co—P, Co—Zn, Fe—W, Cu—Ag, Au—Ag, Pt—Ag, Cu—Au—Ag, Cu—Pt—Ag, Pt—Au—Ag, Co—Ni—P etc. Fe—Mo, Co—W, Cr—P and Mo, La, Ce, Nd, Sm, or Eu doped silver; and may optionally have additional coat of a transparent conductor. Surface resistivity of the conductive coatings on the third surface may typically vary from about 0.001 ohms/square to about 50 ohms/square. Some of these layers may be patterned so that they come in contact with one or more of the electrolyte (cell interior), perimeter sealant, and the area outside of the perimeter sealant. Sometimes a strip or a tab of a conducting coating (conductive metal) is used which runs from the inside of the cell to the outside. In some EC devices one may also include additional electrochromic and/or counterelectrode coatings deposited on top of the conductive coatings (not shown) so that these additional layers are sandwiched between the electrolyte and the conductive coatings. There may also be additional coatings below the conductive coatings in order to change the optics of the device (e.g., increase infrared transmission, reduce unwanted reflections, and control color, etc, see published U.S. patent application 2009/0116097, and U.S. Pat. No. 7,746,534 which are included herein by reference). For the front substrate, the coatings underneath the transparent conductor may be dielectric such as $TiO_2$, $SiO_2$, $ZrO_2$, SiN, TiN, etc. For the rear substrate these may be the dielectric and/or metal coatings.

It is usually preferred to use spacers that are rigid and do not solubilize in the electrolyte so as to impart structural integrity of the cavity of the device during processing and during device use. In some cases it may be desirable to have spacers which are partially soluble or preferably have more than one component wherein one of the components is soluble in the electrolyte. For example during use, when no spacers are present and the devices are large or the substrate rigidity low, one can locally buckle the substrates relative to one another and close the gap by applying a point pressure near the center of the device, which could cause shorting of the substrates causing unnecessary performance issues. In the first inventive method the spacers that are incorporated in the cavity are porous, and preferably with interconnected pores. When the cell gap (or the device cavity) is filled, the filling fluid also permeates the pores in these spacers. Further, within the spacers, both the pore sizes and wall thickness are preferably below the wavelength of the visible light so that the scattering losses are minimized. A preferred upper range of the wall thickness and the pore size is below 400 nm, and more preferably below 200 nm. Preferably, the smallest pore size should be larger than about 5 nm and more preferably equal to or larger than about 10 nm. Particularly for the EC devices with at least one electrochromic dye in the electrolyte, we prefer pore size where preferably all of the mobile components in the electrolyte are able to permeate through the pores. In addition it is also preferred that the surfaces of the fillers (including pore surfaces) are treated so that these are less hygroscopic so that these are easy to dry and do not add unnecessary water to the electrolyte. In addition, these should survive the crushing forces and temperatures during cavity and the device fabrication, and should not have materials that will be sensitive to UV or participate in the electrochemical reactions during the device use. One preferred class of materials that can be used are "wide pore" silicas. Further those "wide pore" silicas which have spherical shapes are even more preferred. For example, Siliasphere™ silicas from Silicycle (Quebec, Canada) may be used. The preferred silicas have a pore size in the range of 5 to 200 nm. Those silicas where surfaces of these (including pore surfaces) are coated with hydrocarbons (typically from C1 to C18, i.e., methyl to a hydrocarbon with 18 carbon long chain which may be linear or branched) are preferred, and these could be in a monomeric or a polymeric format. These are available in a variety of particle sizes, and these can be fractionated in narrower sizes (e.g., by ultrasonic sieving) so that the spacer size is controlled within ±5% or less and preferably within ±2% or less of the desired device gap. These spacers may also be added to the perimeter sealant or one may use solid spacers for the perimeter sealant in order to avoid any entrapment of voids and possibly decreasing the seal permeability to water and oxygen. Porous spacers or other spacers described in this innovation may have advantages when used in the perimeter sealant that bonds the two substrates together. One advantage is to mix this in the sealant (for example epoxy) in such a way that the uncured material (resin and the curing agent) diffuse into these spacers so that when the sealant is cured then the resin inside also cures. This will result in spacers which are composites with mechanical and thermal properties better matched with the sealant as compared to solid glass or inorganic spacers and the organic sealant, and thereby decreasing stress concentrations in the sealant in the vicinity of the spacers. The sealant may be a thermally cured sealant or that which is UV cured.

In a variation, solid low RI spacers can be used to match EC electrolytes refractive index. The typical electrolytes used in current EC devices have their RI between 1.42 and 1.46. These are generally based on propylene carbonate or its mixtures with other solvents.

One way to make low RI spacers is using materials with low RI or making a porous spacer which is infused with a low RI material. In this spacer the two materials are present as two distinct phases, i.e., these materials are not mixed to form a homogeneous composition. To make low RI spacers one may start with porous spacers which may be made by high RI materials (as compared to the electrolyte), and then the pores are filled with a lower RI material, so that the composite spacer RI matches with the electrolyte. The pores of the porous fillers may be filled by a monomeric composition which is first introduced in the pores in a liquid or a vapor form and then solidified in-situ by polymerization. Alternatively a polymer may be introduced from its solution, where the solvent is removed leaving the polymer in the pores. The monomeric composition will comprise of monomers and may further comprise of UV stabilizers, polymerization catalysts and or co-monomers depending on the chemistry and the properties required. These monomers/chemistry may be chosen from a vast array of acrylics, urethanes, epoxies silicone, and fluorinated materials that are available. For materials matching more closely to an index in a range of about 1.42 to 1.46 are silicones, fluoropolymers and saturated polymers. The filled spacers can then be used in the devices and they will be impermeable to the electrolyte but their overall RI will match the electrolyte RI more closely. The choice of the filler in the pores may be such that as an option these could be plasticized by the electrolyte if a compatible crosslinked polymer is used or be solubilized by the electrolyte (in both cases this is referred to as being soluble in the electrolyte).

In a second method, the electrolyte solvent or the electrolyte is used which matches the refractive index of the rigid spacers which may be either porous or solid (non-porous). This matching is usually done at room temperature and also for a wavelength of about 550 nm or using white light. Given a choice, it is preferred that the materials have low relative change in the RI for the usable temperature and wavelength range so that they are within the window of matching parameters. For most applications these are typically between 0 to 50° C., and 400 to 700 nm. Although the refractive index of the electrolyte should be matched to that of the spacers. From a practical aspect unless the additives have a vastly different contribution to the RI, the electrolytic solvent which is the major component (usually 80 to 90% of volume), the matching of RI of the spacers and the electrolytic solvents may suffice. Electrolytes include many components, e.g., these are typically selected from, electrolytic solvents, inorganic fillers, polymers or monomers with reactants and catalysts, UV stabilizers, salts and electrochromic dyes—e.g., anodic and cathodic dyes or bridged dyes with anodic and cathodic parts connected within the same molecule. The need for matching of the refractive index of the spacers to that of the electrochromic electrolyte has been identified before, e.g., see U.S. Pat. Nos. 6,995,891; 7,004,592 and 7,738,155. However, none of these teach on how to do this in a practical way using rigid spacers and do not suggest materials to accomplish this. They also do not address those spacers, which comprise of multiple distinct compositions where a part or a component (or composition) of it may be soluble in the electrolyte, or spacers that do not deform or melt under temperature and pressure through which the cells are subjected to during the processing. Further, none of these address the need to match the RI of the electrolyte and the substrate used to form the cell or the cavity, which has additional advantages as discussed later.

Typical non-ionic electrolytic solvents such as propylene carbonate and gammabutyrolactone have respective RIs of about 1.42 and 1.435. Sulfolane with an R of 1.48 and nitriles with RI between 1.4 and 1.48 have been used in electrochromic devices as a 50:50 mixture with PC (e.g., see U.S. Pat. Nos. 5,140,455; 5,239,405 and 5,724,187). Such solvents and electrolytes are expected to have the highest RI below 1.46. Many ionic liquids that may be used as solvents in electrochromic devices such as those comprising fluorinated anions of substituted imidazoliums and pyrrolidiniums cations also have low RI (e.g., see U.S. Pat. No. 6,853,472, where the ionic liquids of low refractive index such as 1-butyl-1-methylpyrrolidum bis(trifluoromethanesulfonyl) imide with an RI of 1.42 has been used). Typical glass substrates and spacers that are used in the EC devices are made out of soda-lime glass which has a refractive index of 1.52. Borosilicate (also called E-glass) if used, has an RI of about 1.55. In order to match the RI of the spacers and the electrolyte, the material composition of the spacer is such so that their RI at room temperature is about 1.50 or lower, and preferably 1.46 and lower so that there is a possibility of matching them with the RI of the conventional electrolytes. Alternatively, the electrolyte needs to be modified so that its RI is about 1.5 or greater at room temperature and its refractive index can be matched with that of the conventional spacers. The latter possibility offers also an opportunity to match the RI of the electrolyte to the RI of the conventional glass substrates (e.g. soda lime glass) used in fabrication of EC devices, which results in specific optical advantages as discussed later.

One may also use low refractive index solid materials, particularly inorganic materials that are not soluble in typical electrolytes and can match with the conventional electrolytes with an RI of less than 1.5. For example, silica has a refractive index of 1.46 and fluorite crown glass (e.g. FK51A from Schott Glass, Mainz, Germany) has an RI of 1.49 and colorless fluorite (calcium fluoride) which is free of fluorescence has an RI of 1.43. Thus low index spacers are made out of silica, or glass compositions comprising metal fluorides (including silicates, aluminates and other materials that comprise metal fluorides). When electrolytes predominantly comprising the solvents 1-butyl-1-methylpyrrolidum bis(trifluoromethanesulfonyl), propylene carbonate and gammabutyrolactone are used, it is preferred that the non-porous spacer RI be between 1.4 and 1.46. The matching of the RI of the spacer and the electrolyte is particularly acute for large EC devices which are made using the construction shown in FIG. 1. Further, it is not necessary to match the RI of the spacer material to that of the electrolyte when porous spacers with nanosized pores are used.

When the EC devices get large, then for devices using the redox dyes in the electrolyte, one needs to increase the spacer size (or the electrolyte thickness) to reduce the steady state current in the colored state so that the devices can color uniformly and the potential drop from the edge busbars to the cell interior is low (typically less than 0.3V and preferably less than 0.1V). Further, one may have to use spacers in the electrolyte even in smaller devices if the substrate rigidity is low, otherwise that would cause the center of the device to deform easily. One can easily make calculations using engineering analysis programs by taking into account the substrate material modulus, substrate thickness, device size and its curvature to find how easy it is to deform the top substrate in the device when an external pressure is applied using a finger in the center of the device. If using a force of about one pound (0.45 kg) this deformation is between 5 to 10% of the gap between the two glass substrates (or the electrolyte thickness) or a surface strain (extensional) that exceeds 0.001% or preferably 0.002%, then it is desirable to have spacers in the electrolyte. During cleaning or other operations, the presence of spacers will minimize the deformation and reduce the probability of failure by breaking of the substrate. For thin gap devices (100 microns or thinner for exterior mirrors, and 50 microns or thinner for the interior mirrors, see U.S. patent application Ser. No. 12/865,688 filed on Jul. 30, 2010), breakage of the substrate is less of an issue as for the same percentage deformation the strains are lower. The EC devices with soda-lime glass substrates for mirrors generally use substrates which are 1.67 to 2.3 mm in thickness, although thicknesses as low as 1.1 mm have been proposed. Spacers within the electrolyte or the electrochromically active region have been typically used in the exterior mirrors as the surfaces are larger, i.e., their centers are about 6 cm or more from the nearest perimeter sealant. As the size of the device increases, for an electrolyte with similar ion mobilities and using similar conductive coatings with similar surface resistance, the gap spacing between the two substrates has to be increased to keep the color or the coloration depth uniform throughout the area. In particular, when the gap spacing between the substrates starts increasing above 80 μm and more particularly above 125 μm the index matching of the electrolyte and the spacers becomes more important in order to reduce any visual distortion. Although any cell gap may be used, to reduce the use of electrolyte so that the environmental footprint can be decreased, preferred devices are those that use the smallest of the cell gaps or the electrolyte thickness (e.g., see U.S. patent application titled Environmentally safe electrochromic devices and assemblies, Ser. No. 12/865,688 filed on Jul. 30, 2010, which is included herein by reference) which is typically less than about 50 µm for interior EC mirrors and less than about 100 µm for the exterior EC mirrors.

Before discussing the methods to increase the RI of the electrolyte and the electrolyte solvent so that it can match the RI of the conventional spacers and the glass substrate, the merit of electrolyte and substrate RI match will be discussed.

Figure 2:
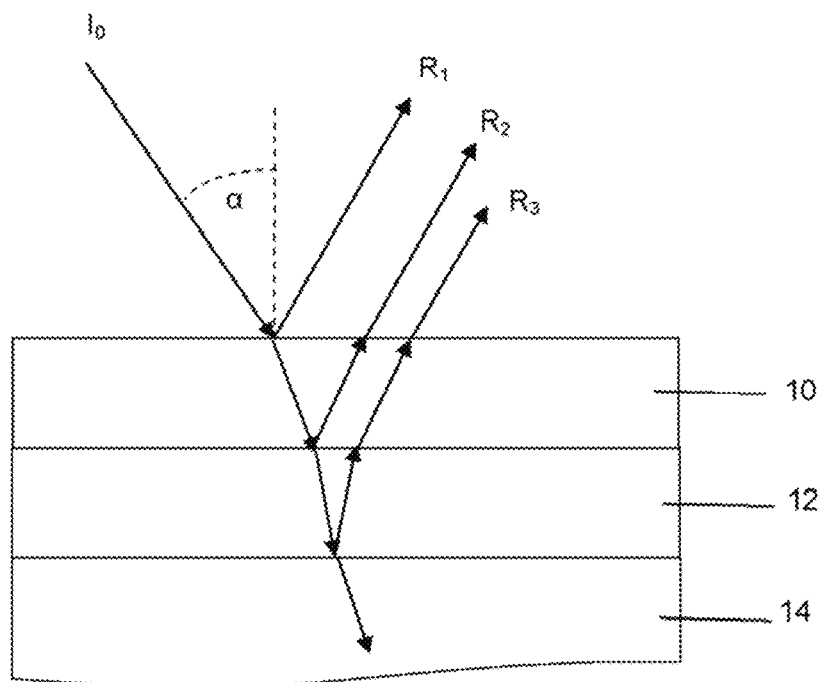
FIG. 2: Schematics of a section of the electrooptical device from FIG. 1, which shows only the first order light reflections from some of the interfaces.

FIG. 2 shows schematics of a section of the device from FIG. 1. The section shown in FIG. 2 is enclosed within the dashed lines and rotated as shown in FIG. 1. This figure only shows the first order reflections in an EC device from the first surface of the front substrate 10, from the interface of the substrate 10 and the transparent conductor 12 and the interface of the transparent conductor 12 and the electrolyte 14. A ray of light strikes the front substrate with an intensity of $I_0$ at an angle of $\alpha$ to the substrate normal. Part of it is reflected with an intensity of $R_1$. As the transmitted ray makes its way into the device, part of it is reflected with an intensity of $R_2$ (ignoring the higher order reflections) from the substrate/transparent conductor interface, and similarly part of the light is reflected from the interface of the transparent conductor and the electrolyte with an intensity of $R_3$. These reflections are caused by the index mismatch of the various layers. The reflected intensities in relation to $I_0$ can be calculated from standard Fresnel's equations in optics. These are dependent on the angle of incidence $\alpha$ and the refractive indices of the various layers. In these calculations, the RI of the substrate was taken as 1.52, and that of the ITO transparent conductor as 1.94. The calculations were done for two angles, $\alpha=10$ degrees and $\alpha=30$ degrees and for different electrolyte refractive indices. The results of these calculations are shown in the tabular format below:

| Refractive index of Electrolyte | Angle of incidence, $\alpha$ (degrees) | Reflectivity, % intensity relative to $I_0$ |
|---|---|---|
| 1.42 | 10 | $R_1$ = 4.3 $R_2$ = 1.5 $R_3$ = 2.4 |
| 1.42 | 30 | $R_1$ = 4.4 $R_2$ = 1.5 $R_3$ = 2.4 |
| 1.52 | 10 | $R_1$ = 4.3 $R_2$ = 1.5 $R_3$ = 1.5 |
| 1.52 | 30 | $R_1$ = 4.4 $R_2$ = 1.5 $R_3$ = 1.5 |

These calculations show that one could equalize the intensity of $R_2$ and $R_3$ by changing the electrolyte refractive index. Mainly matching the RI of the electrolyte to that of the substrate (RI=1.52) causes $R_2$ and $R_3$ to be the same (conversely, one may use a lower refractive index substrate to match the RI of the electrolyte, or adjust both so that their refractive indices match). Further, if spacers are used which have the same refractive index as the electrolyte RI of 1.52, they are also not visible. If one can equalize $R_2$ and $R_3$, then it is also possible to either almost completely reinforce these intensities or almost completely remove them by interference. For mirrors and windows, the latter is preferred as this reduces reflective intensity when the EC device is in the colored or in the dark state. Since the reflection process adds half wavelength or $\pi$ of retardation, for reinforcing the intensity, the transparent conductor (12) should be in a thickness that causes in a single pass quarter wave retardation or multiples thereof (e.g., at 550 nm, the retardation should be ¼, ¾, 1¼, 1¾ 2¼, etc), so that the total phase difference between $R_2$ and $R_3$ is one full wavelength (or $2\pi$) or multiples thereof. In order for these intensities to be annihilated destructively (a preferred scenario for mirrors and windows) the thickness of the transparent conductor should be in multiples of half wave retardation in a single pass, e.g., ½, 1, 1½, 2½, etc. This causes $R_2$ and $R_3$ to be out of phase by $\pi$ and causes them to interfere destructively. If the intensities $R_2$ and $R_3$ are similar then the annihilation of these two would be total. However, if their intensities are not the same then the annihilation will only be partial, which is the case for the current EC devices. This also shows that if one has the capability of tuning the RI of the electrolyte for a given substrate then one can obtain a lower dark state. For auto mirrors that mainly color at night, it may be preferred that these calculations be done at the maximum of the scotopic vision (at 500 nm) rather than at the maximum of the photopic vision (550 nm). Either way, this is a decision that can be taken depending on the customer preference and also it makes little difference in terms of the results as most of the materials used (substrates, transparent conductors and other clear coatings, electrolyte and the spacer materials) have high Abbe numbers, i.e. above 25 and more preferably above 50. As an example, the sheet resistance and the thickness of the transparent conductor (TC) can be calculated from its specific resistance. For an ITO coating with specific resistance of $2\times10^{-4}$ ohm-cm and a refractive index of 1.94 and for an angle of incidence $\alpha=30$ degrees (see FIG. 2) the following can be calculated. In case the TC coatings have different specific resistance and optical retardation, the table below can be easily reproduced taking these changes into account. ITO with higher conductivity may be made by changing the deposition conditions, e.g., use of General Plasma's (Tucson, Ariz.) Mov-Mag™ sputtering technology results in higher conductivity and better target utilization when depositing transparent conductive oxide coatings.

| | 550 nm | | 500 nm | |
|---|---|---|---|---|
| Retardation (fraction of wavelength) | Thickness nm | Sheet Resistance, Ohms/sq | Thickness nm | Sheet Resistance, Ohms/sq |
| 0.25 (Quarter Wave, QW) | 69 | 29.0 | 63 | 31.9 |
| 0.5 (Half Wave, HW) | 138 | 14.5 | 125 | 16.0 |
| 0.75 | 207 | 9.7 | 188 | 10.6 |
| 1 (Full Wave FW) | 276 | 7.3 | 251 | 8.0 |
| 1.25 | 345 | 5.8 | 313 | 6.4 |
| 1.5 | 413 | 4.8 | 376 | 5.3 |

Since the cost of the coating is strongly dependent on their thickness, for practical purposes the range of thickness used for the transparent conductor is Full wave or lower thickness. For interior EC automotive mirrors a preferred range is up to HW ITO and for exterior mirrors it may be extended to FW ITO depending on the mirror size and the required device kinetics. It must be understood that such calculations can be repeated for any applicable angle of incidence, and TC properties (RI and specific resistance). The conductivity of the TC is dependent on its composition and the processing conditions. Regardless of the materials used, one can optically model the reflectivities using standard optical software (e.g. Zemax (Bellevue, Wash.) or Code V from Optical Research Associates (Tucson, Ariz.)) and accounting for the higher order reflections and additional layers and interfaces. The RI of the electrolyte and the thickness of the transparent conductor is chosen so that total reflectivity from the interface of the front substrate and the transparent conductive coating is matched to the reflectivity from the transparent conductor and the electrolyte interface. Further these are out of phase by about half the wavelength so that these can annihilate each other. If the transparent conductive coating comprises of multiple layers (some of which may be non conductive), or one uses a substrate with a different RI (e.g. lower RI, down to 1.42), then these layer thicknesses and their RI can also be optimized so that cumulative of all the reflectivities from all of the interfaces between the electrolyte and the front substrate are destructively cancelled. In addition, these calculations can be done for those average angles where a user is likely to use the product, e.g. these angles for an exterior automotive mirror could be different as compared to an interior mirror and would also be different based on the car shape and size.

Similarly, the coating thickness on the third surface could be modified so that it reduces the unwanted reflectivity, and maximize the light transmission at a particular wavelength or wavelength range (e.g. maximizing infrared transmission while reducing visible transmission), or change or conserve its color of the display that is viewed through the device. Many of the third surface coatings (usually a stack with several coatings) is described in detail in U.S. Pat. Nos. 7,746,534 and in 7,471,438. Displays in mirrors are also described in U.S. Pat. No. 4,882,565. These principles can be used for the devices described in this disclosure.

In order to increase the RI of the solvents close to the RI of soda-lime glass, one may use high refractive index solvents which also can be used in electrolytes without electrochemical decomposition and have good UV and thermal stability. These solvents have an RI of greater than 1.5 and preferably greater than 1.52. If these solvents have higher RI as compared to the spacers and glass, they can be mixed with conventional solvents such as propylene carbonate in order to lower the RI to match it with the spacers and/or the substrate. One example is use of high RI ionic liquid solvents. Ionic liquids with high refractive index are described in U.S. patent application Ser. No. 12/843,799 filed on Jun. 15, 2010. This application is included herein by reference. Preferred anions with high RI ionic liquids have anions such as triflate ($CF_3SO_3^-$), imide ($N(CF_3SO_2)_2^-$), beti ($(C_2F_5SO_2)_2N^-$), methide ($(CF_3SO_2)_3C^-$), tetrafluoroborate ($BF_4^-$), hexafluorophosphate ($PF_6^-$), and hexafluoroarsenate ($AsF_6^-$). Most preferred cations for ionic liquids are quarternary ammonium and phosphonium cations. The preferred quarternary ammonium cations for ionic liquid include, but are not limited to, pyridinium, pyrrolidinium, pyridazinium, pyrimidinium, pyrazinium, imidazolium, pyrazolium, thiazolium, oxazolium, and triazolium. These can have various substitutions or substituents, such as H, F, phenyl and alkyl groups with 1 to 15 carbon atoms. Rings may even be bridged. Also, to raise the RI, substituents with high electron density groups can be incorporated. As an example see Table 1 in Liu 2009 (Liu, J. G. et al, J. of Materials Chemistry, Vol 19, p-8907-8919, (2009)) for several of the possible organic substituents. As an example, some of the phosphonium cations in ionic liquids with high index may have the following cations:

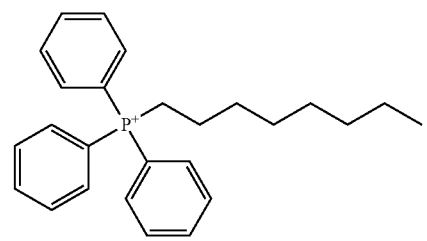

[1]

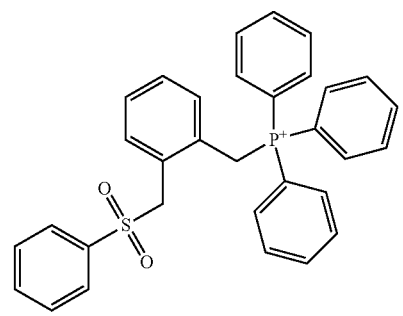

[2]

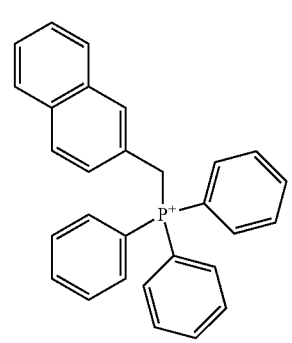

[3]

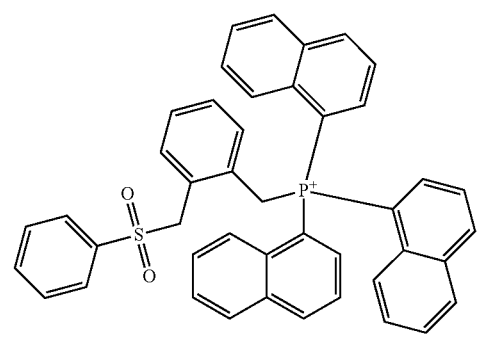

[4]

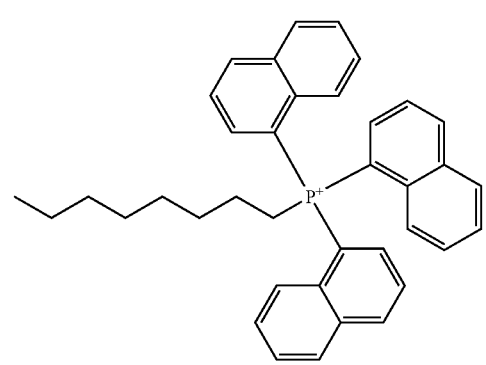

[5]

Triphenyloctylphosphonium imide was prepared and its refractive index was 1.54. In addition to high RI these ionic liquids must be electrochemically stable, and the electrolytes also stable to UV and temperature. For automotive mirrors UV stability may be measured by SAEJ1960 (test method available from Society of Automotive Engineers, Warrendale, Pa.) and a thermal stability to about 120° C. is expected. UV stabilizers may be added to such electrolytes. A non exhaustive list of UV stabilizers is provided in several U.S. patents and published applications, particularly, U.S. application 20100073754 and U.S. Pat. Nos. 7,738,155; 7,718,096; 7,202,987; and 7,004,592. In order for these devices to be durable they have to meet several criterions. Many of the test specifications that pertain to cyclability, UV and temperature stability for electrochromic mirrors are available from the auto manufacturers such as General Motors (Warren, Mich.), Ford (Deerfield, Mich.), BMW (Germany), Mercedes (Germany) and Toyota (Japan). Similarly there are established specifications by other manufacturers that use these products. Some of the durability specifications for aircraft windows are available from Boeing (Chicago, Ill.) and for various electrochromic applications also published in several places (ASTM test method E2240 and E2241; Lynam, N. R., Agrawal, A., Automotive Applications of Chromogenic Materials (pages 46-84) in "Large Area Chromogenics: Materials and Devices for Transmittance Control", edited by Lampert, C. M., Granqvist, C. G., SPIE Optical Engineering Press, Bellingham, Wash., USA (1990); Lampert C. L., et al., *Durability Evaluation of Electrochromic Devices—An Industry Perspective*, Solar Energy Materials and Solar Cells, 56 (1999) 449).

Keeping rigid spacers in the electrolyte but matching their RI with the electrolyte has advantages where substrates of low rigidity can be used, and will keep their distance (gap or interpane distance) during fabrication and use. The low rigidity may be due to the low thickness of the substrate even if it has high modulus (e.g. glass), or the material itself (e.g., most bulk plastic substrates) which have low rigidity. Lowering thickness of the glass substrates or using plastic substrates allows one to decrease the weight of the product. Several plastics can be used, some examples are cycloolefins, acrylics, polycarbonates, polyester and many others (more examples are in U.S. Pat. No. 7,300,166, which is included herein by reference). Plastics may require additional layers for barrier and scratch resistance, which can be easily factored in for reflectivity changes.

Figure 4A:
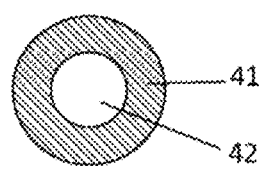
FIG. 4a: Shows a schematic of a core shell spacer bead.

One may also use spacers which comprise of forming them with at least two different materials, which are present as distinct phases (not as a homogeneous mix) within the spacers. One way is to make them with a skin or a core shell structure. The core has different properties (and composition) as compared to the skin (or shell) and most likely has a different composition as well. These property differences may be chemical or physical. Some of the preferred differences are in mechanical modulus, refractive index, porosity, solubility and plasticization in the electrolyte. In some of the preferred configuration, the core is stiffer (or harder), not soluble in the electrolyte or not even plasticized by the electrolyte, e.g., the shell may be a crosslinked polymer that is compatible with the electrolyte (which also means it can be plasticized when the electrolyte is absorbed). Further in core/shell configuration with compatible shell, the core has a lower refractive index that preferably matches the electrolyte RI. If the shell is not soluble or plasticized by the electrolyte then the shell should also have an RI that matches the core. In one configuration, the rigid spacers are coated with a soluble material, i.e. the spacers are partially soluble or have a soluble skin (or shell). This coating is soluble in the fluid that is placed between the two substrates. For EC devices this is the electrolyte or a monomeric comprising fluid that after polymerization becomes a solid electrolyte. This coating is preferably 5 to 20 nm thick. This type of coating allows the cavity to be processed and maintain the gap between the substrates. However, when this is filled with a fluid, the coating dissolves or breaks so that the spacer size becomes smaller or shrinks in size and the forces from the two substrates are reduced or eliminated, and if the cavities are oriented properly, then for liquid electrolytes, these spacers can move and settle at the bottom of the cavity without interfering with the vision in substantial part of the device. However, it is preferred that the spacers (with their coatings dissolved) stay in place if their RI is matched with the electrolyte so that excessive relative buckling of the substrates during the use can be avoided. These spacers can be coated with polymers, monomers, UV stabilizers, EC dyes, soluble salts (e.g. some of the materials that are soluble in the electrochromic electrolytes are named in U.S. Pat. No. 7,684,103), fragile inorganic oxide coatings or of other materials that break away in small pieces as the electrolyte induces stress cracking. In another preferred composition, the mechanical modulus or the hardness of the skin is lower than the core. The softer skin helps in relieving the point stresses on the coated substrates by diffusing them over a larger area. Preferably the thickness of the shell is greater than 10 nm. FIG. 4a shows a spherical (or may be cylindrical) spacer bead with core shell structure. The core 42 is of a different composition as compared to the shell 41.

Fourth Surface Reflectors and Transparent Conductors

When fourth surface reflectors are used in EC mirrors, these typically comprise of a silver layer that is deposited from chemical solutions followed by a galvanic corrosion protection layer of copper and then protected by an opaque paint. This paint may be lead free or contain small amounts of lead which is usually permitted by Restriction of Hazardous Substances Directive or RoHS which was adopted by the European Union in 2006 to limit certain toxins (specifically lead, mercury, cadmium, hexavalent chromium, polybrominated biphenyls and polybrominated diphenyl ether) in electronic components and RoHS2 is being drafted which may bring additional changes. Similar laws and directives with modifications have also been adopted in other geographic regions such as Electronic Waste Recycling Act (EWRA) of 2003 in California, USA. As an example in RoHS, the level of lead at the component level (e.g. in the paint layer) should be below 1,000 ppm which may change in future. The materials used in construction of the products of this invention should be such so that they meet RoHS or any other government environmental requirements where the products are sold. Further, we prefer these also to be free of beryllium and have the smallest possible environmental footprint. Beryllium comprising copper alloys is typically used in the spring clip busbars (or mirror connectors) and sometimes beryllium oxide layers may be incorporated in some integrated chips.

For EC mirrors, the reflectors on the fourth surfaces (i.e., the outside surface of the rear substrate) need not comprise of a silver layer followed by galvanic protection layer such as copper and then painted, as this results in opaque layers and are not suitable for attaching displays and/or light sensors on the back of the mirrors, unless such coatings are removed from the area where the display is located. In these mirrors, the paints used are opaque and also the combination of the silver and copper results in an opaque reflector.

The fourth surface reflectors may comprise of metals (or metal alloys) which are corrosion resistant and optionally the coating thickness is such so that these are semitransparent over the entire area or only those selected areas which need partial light transmission as a display or a sensor (e.g., eyehole) may be mounted behind that. This clarity may be controlled by coating thickness and/or by patterning the coating in that selected area (e.g. mesh pattern or lines and the line width selected so that it does not lead to undesirable diffraction effects and these area look contiguous with the rest of the reflective surface to the driver of the automobile). A preferred width of the metal and the areas devoid of the metal should be less than the width that subtends an angle of less than 0.01 degrees so that these are not visible, which is less than 100 microns when the user's eyes are about 19 inches from the mirror, (see U.S. Pat. No. 6,449,082). Additional corrosion resistance may also be impacted by depositing additional layers on the metallic coating which are clear or opaque and may comprise of metal compounds (e.g., metal oxides and nitrides) or polymeric coatings and paints. The thickness of the reflective layers may be such so that they are reflective and may have a transmission of about 1 to 20% if displays or sensors need to be added behind these coatings. As discussed in the section on displays and insignias, one needs to have high reflectivity of these coated substrates when looking from the direction of the front surface, and high transmission when looking from the direction of the rear surface. As discussed later such asymmetry is possible. For interior mirrors from the front surface of such substrates should have a reflectivity exceeding 80%, and for exterior mirrors this reflectivity should be in excess of 65%, and from the rear the transmission should be greater than 1% and preferably greater than 5%. For transmission in the visible region the thickness for most metals will be in the range of about 60 nm to about 200 nm and preferably in the range of about 100 to 160 nm. This transmission is measured in the operating wavelength of the display if it is monochrome or measured in the entire visible range for colored displays and a representative measurement made at 550 nm. For color displays if the transmission in the primary colors is not uniform, then one may also use an algorithm to change the intensity of these colors for effectuating color correction or use additional interference or correctional filters and coatings between the display and the reflective layer. These could be followed by transparent metal compound layers. The metals and the metal compounds may be deposited by sputtering, and the polymeric paints by curtain coating, spraying, brushing or any other means. When transparent metal compounds are used, their thickness (i.e. their optical path) needs to be controlled so that these do not add color to the displays or cause interference effects that will cause optical distortions. A method of calculating such thicknesses was discussed earlier. Typical metal compound coating thickness will range from about 10 to 200 nm. The thickness of polymeric coatings is typically from several microns to several hundred microns. These paints are either transparent in case the displays or optical sensors are mounted onto these while looking through the mirror, or if these are not transparent then these coatings are not put by masking specific areas wherein the optical components are attached to.

Some examples of reflective metals that can be used on the fourth surface are silver, titanium, aluminum, ruthenium, rhodium, chrome and their alloys. Exemplary alloys of silver are those doped with one or more of Au, Pt, Cu, La, Ce, Nd, Sm, and Eu. The concentration of the dopants is in a range of about 1 to 10 atomic %. Exemplary alloys of aluminum are series 1xxx (or 1000 series), 2xxx (or 2000 series), 3xxx (or 3000 series), 4xxx (or 4000 series), 5xxx (or 5000 series), 6xxx (or 6000 series) and 7xxx (or 7000 series). Of these the most preferred are series 1xxx (predominant alloying element is copper), 3xxx (predominant alloying elements are magnesium or magnesium and manganese with iron and silicon), 5xxx (predominantly alloying elements are manganese, magnesium-chromium, magnesium-manganese-chromium, and magnesium) and series 6xxx (predominantly magnesium-silicon). A typical way to test against corrosion is to spray the sample with 5 wt % sodium chloride solution in water at 35° C. for 144 hours. At the end of the test there should be no change in the reflectivity and no change in mirror cosmetics. A few specific aluminum alloys that have good corrosion resistance, particularly to salt spray test are 5052, 5083, 5086, 6061 and 6063. One may also produce aluminum alloys directly on the substrate by co-sputtering of aluminum and other metals that are suitable for thin films. As an example doping with 5 to 10 atomic % Mo has been found to be effective (Frankel, G. S., et al., J. of Electrochemical Society, vol 136, p-1243 to 1244, 1989). Some other examples of metals alloys are W—Ni, Ni—Mo, Co—W, Ni—P, Ni—W—B, Fe—P, Co—Mo, Co—P, Co—Zn, Fe—W, Co—Ni—P, Fe—Mo, Co—W, Cr—P. Corrosion resistance of the metal coatings or metal coatings with protective coats should be able to withstand at least one of these salt spray tests to prove their resistance to corrosion, these are ASTM B117 (American Society for Testing Materials, West Conshohocken, Pa.), ISO9227 (International Organization for Standardization, Geneva, Switzerland) and SAEJ2334 (Society of Automotive Engineers, Warrandale, Pa.). It is preferred but not necessary that such corrosion resistant compositions are also able to withstand steam autoclave testing at 120° C. for seven or more days. The fourth surface reflectors described here may also be used for day/night prismatic mirror reflective coatings instead of silver coatings protected by copper and a paint layer which are used at present.

Figure 4B:
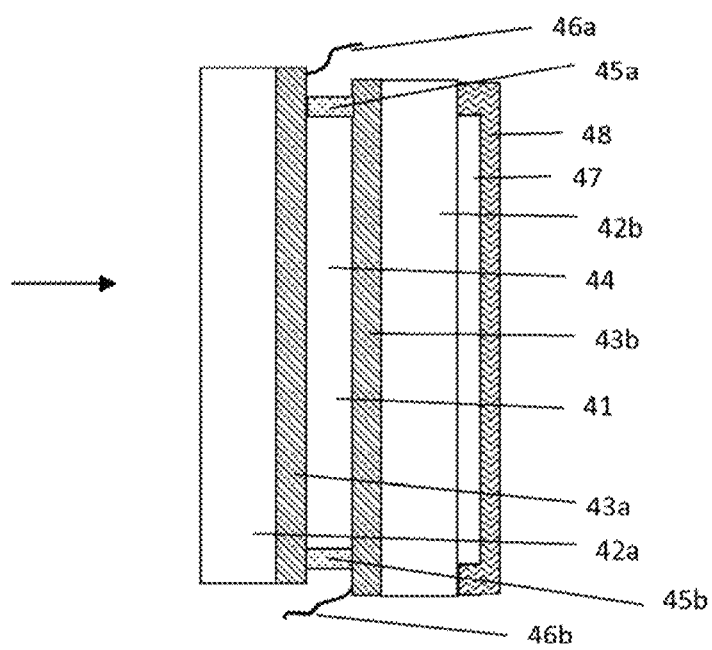
FIG. 4b: Shows a fourth surface reflector mirror with a protective coat to protect the reflector.

FIG. 4b shows the concept of a fourth surface EC mirror (e.g., an automotive rearview mirror) where the fourth surface reflector is protected by another thin layer. The mirror viewing direction is shown by the arrow. The two substrates 42a (front substrate) and 42b (rear substrate) are coated with transparent conductors 43a and 43b respectively. These are glued at the perimeter in a spaced apart relationship using the glue shown as 45a and 45b (this is the same glue line but in cross-section appears as two units). The cavity (or the chamber) formed by the two substrates comprises of an electrochromic medium 44. The powering connectors are shown as 46a and 46b for the two substrates (the busbars on or near the substrate edges are not shown). The fourth surface reflector is shown as 47 which is protected by the layer 48. Layer 48 is transparent and the layer 47 is transreflector (meaning that it has both optically reflective and transmissive properties), particularly if a display needs to be added behind layer 48 which will be visible from the viewing side. Preferably layer 47 is deposited through a mask so that a thin ring around the perimeter of the substrate is not coated and the protective layer covers the edges of the reflective layer and provides superior corrosion protection. If a display is not required behind the mirror, one may use aluminum or its alloys in thickness of about 500 to 1,000 nm followed by a protective coat of silica in the range of about 50 to 200 nm.

Examples of more specific transparent metal compounds are metal oxides (e.g., silicon oxide, aluminum oxide, titanium oxide and tantalum oxide), metal nitrides (e.g., silicon nitride, titanium nitride, zirconium nitride) or carbides (e.g., silicon carbide, metal oxy-nitrides (oxynitrides of Al, Si and Ti). Examples of polymeric paint and lacquers are those based on epoxies, alkyds, polyurethanes, polyesters, acrylics and silicones. These could be reactive type and solidified by solvent evaporation or both by solvent evaporation, and curing (i.e., polymerization including crosslinking). These may be non-reactive type and may be solidified by cooling (thermoplastic) or by solvent evaporation. These paints may contain adhesion promoters, oxygen and moisture inhibitors, UV stabilizers and nanoparticles (such as layered nanosilicates) to restrict moisture and oxygen transport. The polymeric paints may also be used as adhesives or surfaces to which the optical (sensors and displays) and/or electrical components (powering electronics, interconnects and drivers) may be affixed. The polymeric layer may also be rigid or flexible (including elastomeric) so that would provide scatter resistant properties, in case the mirror breaks and one needs a medium to hold on to the various broken glass pieces.

The reflective coatings described above including the antireflective features for displays mounted on the back of the mirrors may also be used for those mirrors that are not electrochromic, i.e., do not have the self-dimming function. These mirrors are formed using a single substrate, bent or planar for both interior and exterior mirrors. It is common to use prismatic shapes of the substrates to form mirrors on the vehicle interiors. Therefore such coatings can be deposed on the second surface of the transparent element (glass or plastic). The first or the front surface is the element that faces the viewer and the second surface or the back surface of the substrate is where such reflective coatings can be deposited and the displays mounted behind these as discussed above. For example such mirrors can be envisioned as those shown in FIG. 4b, but without the front substrate 42a, associated coatings and the electrolyte layer 44 and the transparent conductor 43b. Instead of 43b one may substitute coatings that are hydrophillic or have antireflective properties for exterior mirrors. For interior mirror the substrate 42b may be prismatic rather than being planar.

Integration of Electronic Circuits and Components and Features into Mirror Cases or Housings of Other EC Devices.

Automotive mirrors, are making increasing use of electronic features (e.g. see U.S. Pat. Nos. 7,832,882; 7,772,966 and 7,651,228 and U.S. patent application 2010/0321758) and displays and indicators (e.g., light emitting diode (including organics light emitting diodes), vacuum fluorescent, electroluminescent, electrowetting, electrophoretic and liquid crystal types of systems), reading lamps or general illumination lamps, temperature and or humidity sensor, biometric imager, compass or a GPS system, communication systems including wireless devices, a forward facing camera or imaging sensor (such as for a rain sensor system, backup view, an automatic headlamp control system, a lane departure warning system, or any other vision or imaging system of the vehicle), a microphone, garage door opening circuitry, seat or vehicle occupancy detection system, anti-theft system, node to control lighting and other features, a remote keyless entry sensor, a tire pressure monitoring system, an electronic toll collection sensor, etc. to name a few. These are all in addition to the basic glare sensing and powering electronics that is needed if these features are added to an electrochromic mirror or these may be added to any other automotive mirror which does not have the electrooptic property of self dimming. In addition, for interior mirrors, many of these require a human interface such as buttons to enable or disable features or these accessories or even to select them. All of the electronics can be housed into the mirror casing or can be outside of the mirrors. Further, many of the human interfaces may be located on the case in front of the interior rearview mirrors or any other place where they are accessible.

U.S. patent application 2010/0321758 describes conventional methods of providing capacitive switches for the mirror housings. This also describes conductive metal or conductive plastic (such as polyaniline) inserts that can be molded or fashioned and then incorporated into the molded mounting element during the injection molding process or placed or pressed into or onto the mounting element after the molding process. Further, this patent application discusses a two-step injection molding process that could be used with a first step involving molding of conductive portions of the mounting element from electrically-conductive plastic and another step involving molding non-conductive portions of the bezel using a non-conductive plastic. This application also describes a contact point that engages the switch which could also be a plastic or metal form or tape that contains the switch conductor or pattern that is adhered to the mounting element or a surface of the mirror element, preferably in a periphery of the mirror substrate.

Unlike in U.S. patent application 2010/0321758 many of these features i.e., conductive inserts, conductive circuits, switches, etc., can be all formed or integrated in a more reliable fashion and at a lower cost typically using a common substrate. Further, this integrated assembly can be placed into an injection mold, where the molded product is the housing or the mounting element for the EC device (e.g., an automotive mirror). Flexible film with these components can be mass produced, and then this film is placed in an injection mold along with several of the optional components and then the plastic mounting element is formed by molding process. The mounting element may be a bezel, housing or any other element. Such novel disclosure for EC mirrors is given below in detail. The flexible plastic film could have electronic components and circuits formed on both sides, including printed appliqués on one side. When this film is molded, then it can be done so that its front side with the appliqués is visible in the injection molded article that would act as a user interface. This film may also be comprised of several films which are preassembled (e.g., laminated and shaped) before placing this in the mold for further integration with the mounting element. Wherein each film may provide a specific electronic/optical or interface feature, and the electronics from one film may be connected to the electronics in one or more of the other films. As discussed below formation of a circuit may require several layers of printed material with different properties and patterns on a substrate. Some of the property examples of these materials may be conductive, semiconductive, dielectric, insulating layers or serve only decorative or masking functions. Since these circuits are later put in a mold, the substrates and inks should be so chosen that they survive the temperature and/or the flow and chemistry of the material that is molded around them (for example see U.S. patent application US2009/0108985 for example of a multilayer film).

One can use printed circuit boards where a lot of these electronic features are assembled, but one may make a judicious choice of components which may be integrated into the casing by using techniques wherein the components are molded into the cases (in-molded) and may even provide structural support. One may also provide conductive wires/cables which may be in-molded into the automotive rear-view mirror cases. Some of the readily molded components are electrical connectors, sensors (to detect rain, light sensors for glare and day night detection, image sensors for headlight and proximity control and electromagnetic sensors such as for compass), antennas, heating elements, conductive lines to minimize the use of wires to link different elements, and also switches. The electrical connectors could also assist in attaching power or sensor/signal cables to take these in and out of the mirror case. These switches could be capacitive type, which are actuated by touching the object or the case in various places or bringing the finger close enough in proximity to a specific area so that these are triggered. This also reduces failures due to mechanical movement in conventional switches such as push buttons and sliding switches. Example of making such features on films including construction and materials and their incorporation in final structures by molding in plastics is provided in published U.S. patent applications US2009/0108985; 20080202912; 20050231879; 20050194454 and U.S. Pat. No. 6,219,253, which are included herein by reference. Particularly figures in U.S. patent application 2008202912 are quite illustrative on producing circuits for capacitive switches by multilayer deposition on a substrate, and then incorporating this substrate into molded components and connecting these to the rest of the vehicle. In addition, conductive traces may also be printed on the inside of the cases (or housing) or even outside (as long as they are aesthetically acceptable) to supplement the molded in and other components on circuit boards within the case. These traces provide replacement of some of the harnesses and/or replace some of the components within the circuit boards present inside the housing. Circuits on flexible (typically 25 to 500 μm thick plastic substrates) or rigid substrates may be formed which are then integrated into the casing. In some cases preformed circuits may also be placed in the mold of an injection molding, reaction injection molding or a transfer molding machine. Some or all of the components (including transistors and memory elements) for these circuits may be formed by printing (or transferring a printed pattern from a decal) in order to reduce their cost. Use of flexible circuit boards, printed conductors and wire management is described in U.S. Pat. Nos. 5,355,284; 6,244,716; 6,657, 767; 7,287,868 and 7,334,922 which are included herein by reference. However, none of these patents describe the use of in-mold integration processes for integrating electronics while forming the housing. All of the features described in these patents can be improved by combining these with printed electronic elements on the housing surface and/or using in-mold placement of appropriate electronic elements. Printed conductive lines are formed by using inks comprising conductive particles and are known in the art. Conductive inks comprise of metals (e.g. silver, copper, nickel and their alloys) or carbon/graphite/graphene based materials wherein the particle sizes of these in inks range from a few nanometers to several microns, including fibers where their length may run into hundreds of microns. In addition, the position of the switches may be printed on the cases or produced by in-mold decoration techniques so that no post-molding operations are needed. Some of these technologies are available from Ink-Logix (Birmingham, Mich.) and T-Ink (New York, N.Y.). As an example, some of the conductive metal nanoparticle inks are available from UT Dots (Champaign, Ill.), ANI inks from Applied Nanotech (Austin, Tex.) and Metalon inks from Novacentrix (Austin, Tex.). Such inks can be deposited by inkjet printing or other printing or other wet chemical deposition processes. Metalon ink ICI-003 from Novacentrix comprises of copper oxide nanoparticles along with a reducing agent in the formulation. When this is deposited, the follow through tool (e.g. PulseForge tool also from Novacentrix) with laser pulses reduce the copper oxide nanoparticles to copper and then fuses them to form a continuous busbar. More materials including a variety of conductive nanoparticles, and also dielectric and insulative inks along with printing methods are disclosed more extensively in non-provisional U.S. patent application entitled "Sealants and conductive busbars for chromogenic devices" Ser. No. 13/091,032, filed on Apr. 20, 2011, which is included herein by reference. This discussion of forming (or printing) of conductive traces (or current carrying elements) are applicable to electrochromic mirror case (or housing) and also to the frames around a window (such as an aircraft, boat, building or an automotive window.

Capacitive switching detects changes in capacitance due to a switching event, such as the placement of an object or a finger proximate to or in contact with the switch. Capacitive switches are preferred from the resistive approach because they require substantially no force to realize switch activation. The actual sensitivity of this type of switch can also be tuned via a detection circuit and accidental activation of switching can be avoided and is explained in published U.S. patent application 2009/0108985. Capacitive switches beneficially provide immunity to interference and eliminate the need for electromechanical switch gear (e.g., pushbuttons or sliding switches). In addition, because there are no moving parts, the failure rate is low. However, preferred manufacturing methods for capacitive switches are those which are easy to integrate into flat and contoured three-dimensional support structures (e.g., user interfaces such as control panels). Similarly, in-molded resistive and shielding elements can be made for a variety of applications. Application of patterned resistive elements can be for antennas for communication and power (e.g., for cellular devices, radio frequency identification devices (RFID)), and these resistive elements may be used as heaters, components of circuits, e.g., RC elements or plain resistive elements for a circuitry, etc., forming a conductive mesh pattern or a coating on the film as described below to shield from specific electromagnetic or radio frequency interferences, etc.

For example, a method of making an article with an in-molded capacitive switch comprises providing a electronic film (or the electronic circuitry formed on a flexible film) having a front surface and a back surface, applying a conductive ink sensing zone on the back surface, and forming the film into a desired shape (e.g., by vacuum or high pressure forming). The electronic film is preferably disposed in an injection mold having an interior such that the conductive ink sensing zone faces into the interior of the mold. Molten plastic is flowed into the injection mold to create a plastic support structure attached to the electronic film, thereby creating the article. Alternatively, reaction injection molding or transfer molding may also be used instead of the injection molding. The conductive ink sensing zone usually does not contact any of the surfaces of the mold, or this may be integrated with a connector which is also molded into the article or the mounting element (for example electrochromic mirror case or a frame around a window (such as an aircraft, boat, building or an automotive window). The connector may be connected to at least one conductive sensing element, and then later during the assembly of the mirror it may be connected to the other electronic components and circuits which are present in the complete mirror case or window frame assembly. Part of this electronic film (or a surface) may also have artwork such that various switches (or zones) and functions (indicia) which may be exposed physically (inside or outside of the housing) or is made visible through a window by molding using an optically clear plastic. As an alternative, one may also place optically clear elements made of higher melting point plastics or glass in the housing mold with or without the electronic components so that these are integrated with the housing as it is formed. These electronic films may even provide backlighting by electroluminescent or light emitting diode elements to help with the visibility of the features or to provide feedback when a switch is activated or even produce lighting (e.g., reading lamp). These films for flexible circuits may be colored, translucent, clear, opaque, UV and/or heat stabilized and may even have coatings for protection such as hard coats and moisture and/or UV resistant layers. Some of the preferred plastics for films are polyester and polycarbonate. The integration of some of the electronics within the plastic housing of mirrors, particularly comprising switches, connections, electronic interference shields and antennas and the additional circuit boards present within the mirror housing allow one to reduce the thickness of the complete interior mirror) to produce a thin profile, e.g., less than 3 cm and preferably less than 2.5 cm.

One may also make use of transparent capacitive switches on glass surface of electrochromic mirrors. For example, U.S. patents discuss capacitive switches that are integrated with the glass surfaces of EC mirrors in U.S. Pat. Nos. 7,706,046 and 6,614,579. Although the use of these and integration of switches with circuitry is well known, this method of providing switches unnecessarily extends the glass surface of the mirror which increases the weight of the mirror and also reduces scattering safety in case of an impact. If one has to use glass, then it is better to form transparent capacitive switches on the front of the substrates within the active area of the device and protect these by a hard wear-resistant coat. These can be then connected on the sides near the perimeter or on the edge with the circuits to power these. These are transparent switches that are formed by multiple transparent layers of conductive traces on the first or the second surface of the mirror or window devices. Conductive coatings may be chosen from indium tin oxide, gold, aluminum doped zinc oxide, antimony doped tin oxide and composites where conductive nanoparticles are dispersed in a resin, and transparent dielectric layers such as silica, zirconia, tantala, etc., where the top dielectric layers also act as anti-abrasive layers. Such switches can be particularly effective when combined with the display units, wherein these displays can indicate the position of various switches and functions. Display units and/or backlighting are particularly being integrated with electrochromic mirrors as was discussed earlier. Use of capacitive switches on glass with integrated displays is routinely used on touch screens of portable devices such as cellular phones, computers, transaction terminals, etc.

Figure 9:
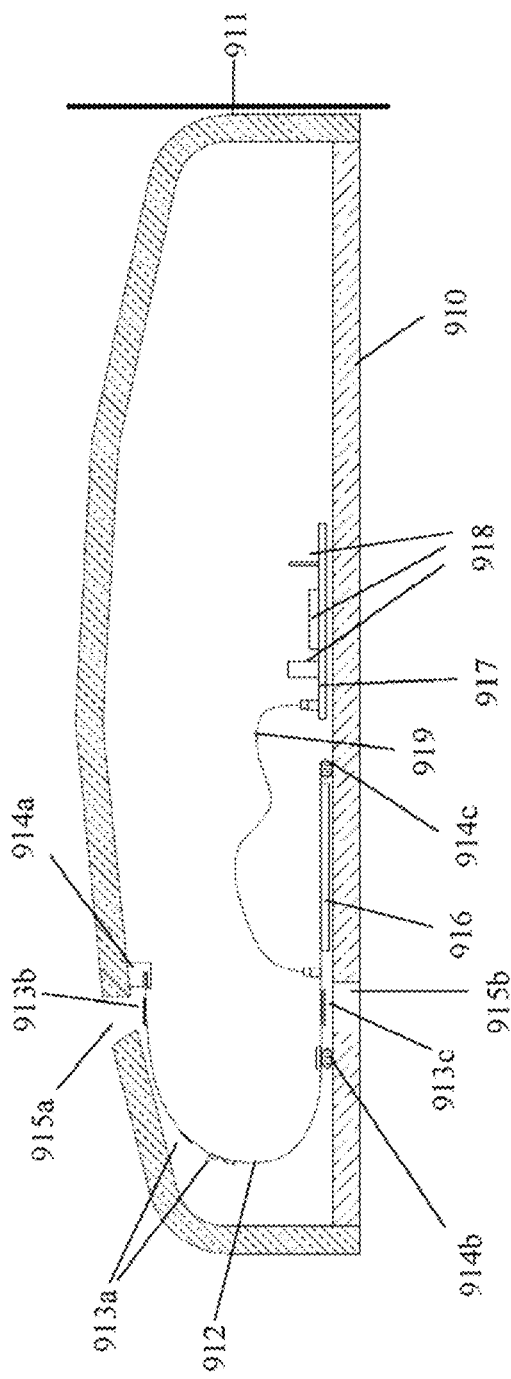
FIG. 9: shows schematics of an automotive rearview EC mirror with housing along with a flexible circuit and several electronic components including a display.

Usually organic material sensors are protected with films or coatings that block UV light, or even visible light below 450 nm. As discussed earlier, organic material light sensors (e.g. for visible and for near infrared) are easy to integrate with other electronics on flexible substrates and may be printed with other electronics components. For example, ISORG (Grenoble, France) and Nikkoia SAS (Grenoble, France) provide materials and finished organic photosensors and image sensors. Since such materials can be put on flexible substrates, their form factor can adapt different geometries which increase their performance in sensing light from a number of directions. One needs to ensure that their sensitivity to changes in ambient moisture and or temperature is compensated or addressed. For example, one may use different pixels of a sensor on a substrate to sense ambient and glare conditions that point in different directions, and could be adapted better for the driver. One may also integrate on the same flexible circuit the ambient and the glare sensor, so that this circuit is flexed (turned around by 180 degrees) so that part of the film with the ambient sensor faces the back of the mirror case, looking through the windshield, while part of the film with glare sensor is close to the mirror element and faces the rear for glare signal. This is shown in FIG. 9. This figure schematically shows an interior electrochromic mirror, where the EC element is shown as 910, and the housing is shown as 911, which is typically made out of a plastic material. This material has an electronic circuit board which is made out of a flexible substrate 912. As shown, this circuit board has optional electronic components shown as 913a. These may provide other electronic functions as discussed earlier and may be GPS and other sensors. Further, this circuit board can have several optical sensors (these may be organic sensors or silicon photodiodes) of which two optical sensors 913b and 913c are shown. 913c is shown facing the rear of the car to function as the glare sensor from the trailing cars and 913b is shown facing the front of the car to function as the ambient light sensor. The ambient light sensor is exposed to the view through a window 915a in the casing, and the glare sensor is exposed to the view through a clear or a transreflective area in the mirror 915b. The glare sensor may be so placed so that there is a window in the case or the bezel (not shown) rather than a window in the active area of the mirror. One may have additional optical sensors including cameras or imaging sensors (these sensors may include any lenses that go with them), such as a rain sensor, headlight sensor (for cars coming from opposite direction) that are looking at/through the windshield. One may use a forward looking camera to capture the front view and use the image as a video feed for the passengers in the back seats, or may record the video feed for any use in future, e.g., as a car black box in case of an accident. The flex circuit board is anchored in position using mechanical anchors such as 914a, and/or adhesive joints e.g., 914b and 914c. Also shown in this figure is an optional display 916 which is mounted on the same flex circuit. This display may be used to show the camera view of the rear vicinity of the car during back up. This display may be placed or integrated with another circuit board which may or may not be flexible. This figure also shows an additional optional circuit board 917 (which may be rigid or flexible) with various electronic components 918 and this is optionally connected to the circuit board 912 by a electronic cable 919. The use of flex circuit board allows various (or more than one) optical sensors (including image sensors) to be mounted preferably on the same side. However, during assembly, the flexing of this circuit board is used to point these sensors in different directions, and in the case shown in the figure, the circuit board is flexed at an angle of about 180 degrees so that the sensors are pointed in opposite directions. Electronically conductive traces may be formed on the flex circuit board by conventional methods or printing methods, particularly using conductive nanomaterials as described in non-provisional U.S. patent application entitled "Sealants and conductive busbars for chromogenic devices" Ser. No. 13/091, 032, filed on Apr. 20, 2011. The assembly of the components on the flex circuit board including sensors can be carried in any fashion, some of these may be formed on the substrates or assembly methods described in published PCT application WO/2010003138, which is included herein by reference. This is an easier electronic assembly as compared to mounting sensors on both sides of a circuit board, and connecting at least one of these with a long light pipe to cover the distance from the circuit board to the back and/or the front of the mirror casing.

One may also either add additional photo-sensors or tune the wavelength of the sensors so that the EC function of the mirrors can be improved in tricky lighting conditions especially at sunrise and at sunset. As an example, a car travelling east when the sun is setting can cause glare to the driver due to solar radiation, but the ambient lighting is still high, and the mirror does not darken. Near sunrise or sunset (when the air mass (AM) calculated on the zenith angle of the sun, or the length of atmosphere through which the solar radiation travels is larger, typically AM>2.5, preferably greater than 4), the longer wavelength visible colors (yellow to red) are stronger as these do not scatter to the same extent as as shorter wavelength visible colors (e.g., blue and green). Quantitative irradiance of the solar spectra at various times has been published (e.g., see King et al, report SAND-97-1183C from Sandia National Laboratory, Albuquerque, N. Mex., 1997). This shows that the relative irradiance or the ratio at sunrise for longer wavelengths (580 to 650 nm) compared to shorter wavelengths (e.g., 475 to 550 nm) is higher. This information could be used to spectrally manipulate the signals (i.e., the signals are derived from different part of the optical spectrum, preferably visible spectrum) in order to address this issue. This could be done by placing optical filters in front of the sensors.

In one implementation, a third sensor is added which provides the input if the sun is setting or rising, and preferably this sensor is pointed backwards. Tuning a first backward facing photo-sensor in the longer wavelength (about 580 to 650 nm) and a second backward facing photo-sensor at a shorter wavelength (e.g., 475 to 550 nm or scotopic or photopic), and measuring the intensity ratio 'r" could provide this input. For the position when the sun is low in the horizon, r will be larger e.g. 1.05 or 1.1, etc., When the intensity measured by the shorter wavelength sensor is high (in daytime when the sun is high, or at nighttime), then the input from the longer wavelength sensor could be disregarded, and the shorter wavelength sensor can be used as a regular glare sensor. Spectral tuning of sensors is easy by either adding an optical filter (e.g. U.S. Pat. No. 4,799,768 describes the use of photopic filters in front of the photosensors in an EC mirror), or changing the material of the photosenor to shift its wavelength response. The second process is much easier to implement when organic sensors are used and in addition, the shorter wavelength sensor may also be used as the glare sensor from which the output that is related to conditions of sunrise and sunset is obtained, then more weight is given to the glare signal as compared to the ambient signal to turn on the EC device. This ratio "r" value should be above the ratios found from car lamp intensities (e.g., halogen, tungsten halogen and xenon lamps), and in the normal daylight hours Insignias and Displays One issue with all of the passive indicators (e.g., also called insignias, indicia, etc.) in automotive electrochromic mirrors is that either they have good visibility in the daytime (when the mirror is bleached and the ambient conditions are bright), or at night when the mirror is colored and the visibility is enhanced by a differential reflectivity or absorption when illuminated by another vehicle or another source. Those insignias are desirable that can be seen in nighttime and during the daytime under multiple illumination or ambient conditions and whether the electrochromic mirror (if used on an EC mirror) is bleached or dark. Further, in many situations it is desirable that these be observed not by the driver of the car, but by people who are in the vicinity, such as drivers of other cars or other people nearby. As discussed in detail such attributes can be imparted by incorporating insignias which use retroreflective properties and/or use luminescent materials. Further such insignias may be used in mirrors that are not electrochromic and even in other automotive areas and components. Many of the features described here may also be incorporated into rearview mirrors that are not electrochromic or do not have automatic self dimming function. These can be interior prismatic mirrors, or exterior mirrors planar or bent. Such insignias may be formed within the reflective region (area) of the mirror or its casing (housing). When formed on the reflective area this may be deposited on any of the substrates (e.g., if the mirror has more than one substrate such as an EC mirror formed by two substrates) and any of the surfaces of these substrates.

Thus in order to achieve visibility in a variety of conditions, one can use materials or systems with different properties during daytime and during nighttime to enhance their visibility. For example an indicator that has different reflective properties as compared to the mirror would be visible in the daytime (e.g., an etched sign or a sign made of a dark colored material), and if the dark material had fluorescence or phosphorescence properties (collectively called luminance properties), then it could emit a different color light as compared to the reflected light color from the mirror, thus enhancing its visibility at nighttime. In an a mirror including an EC mirror (which may be made out of two substrates disposed in parallel with an electrolyte in between), and if this material is located on the first or the second surface then it would be visible under most normal broad band (e.g. white light) lighting situations. The fluorescent and phosphorescent materials (phosphors) absorb at one wavelength and emit in a different wavelength. These phosphors can absorb in UV or can be colored to absorb in the visible region. The colored phosphors can provide good visibility under daylight conditions, and when these are illuminated at night by the headlamps of the cars and the other sources of ambient light. Particularly preferred are those phosphors that emit in orange and red colors. One may even use luminescent insignia to promote safety at night, so that these light up (or become bright) when the trailing cars are close to warn the driver to be careful about changing the lanes.

Particularly attractive materials are those that absorb in the wavelengths below 525 nm (including those where the excitation is in the UV range) and emit in wavelengths above 525 nm, more preferably at or above 600 nm. An example of an inorganic fluorescent material is zinc sulfide doped with one or more of transition element or rare earth elements. There are many oxides and phosphates doped with rare earth elements that are used as phosphors. Some examples are yttrium oxide and lanthanum phosphate which are doped with cerium, europium, terbium, etc. Organic materials such as materials selected from optical brighteners may also be used. A large variety of phosphors, their properties and compositions can be found in many references, one reference is Phosphor Handbook edited by Yen et al, Second edition, 2007, CRC Press, Boca Raton, Fla. Some short publications that cover a variety of phosphors can be found in Srivastava, et al and in Setlur, et al. The phosphors may be combined with materials that exhibit no fluorescence or phosphorescence for adding a desired color and provide better optical contrast under more specific illumination conditions (e.g., where this sign may be visible only at nighttime or both in the day and at nighttime). These materials are typically dispersed in a binder (adhesive) and optionally removable solvents may be used so that these can be printed on the surfaces. Some of the techniques may be used to mark very subtle features which may only be visible under specific illumination of wavelength or direction. These can be used e.g., to inscribe specific lot number for identification. Such identification may be used in manufacturing of the parts, car assembly or by law enforcement agents. These may also have fluorescent or phosphorescent properties so that they can be seen with specific illumination detectors. As an example, when these are illuminated by UV radiation, these may emit in the visible radiation. Materials with different RI or with fluorescent/phosphorescent properties may be used to mark other glazing products that are used on a car or elsewhere.

The addition of insignias such as a symbol for a manufacturer of a car as described in U.S. Pat. No. 7,859,738 by using a specularly reflective coating on the second surface, third or fourth of the EC mirror comprising of two substrates with enclosed EC medium is not very effective. This is because such insignias should be observed by drivers of other vehicles rather than only by the driver of the vehicle on which this mirror is located. The way the car mirrors are positioned is to maximize the view of the vicinity for the driver. When the lights of the nearby cars fall on these mirrors, the reflection from these insignias are directed towards the car occupant, thus such insignias are not visible or seen by the driver of the other cars in the vicinity, and in addition, these cause glare for the driver for the car with this mirror. So that the glare is not too high, these insignias have to be small which further reduces their utility. In order to overcome this problem of poor visibility by the other drivers in U.S. Pat. No. 7,859,738, they suggest use of directional backlighting so that these insignias may be visible. However this is not cost effective. In order to have low cost insignias, these should be made of materials/coatings or optical designs that are retroreflective rather than being specularly reflective. This means that the lights falling on these insignias will be reflected back to the source, or in the same direction it is coming from. The source of light can be from other cars (i.e., car headlights) in the vicinity. In addition, the reflectivity from this will not cause a distraction for the driver which has the mirror with the insignia. In addition, the retroreflectors reflectivity and the divergence of reflection can also be controlled so that it is visible to the other drivers (and not to the driver of the car in which the mirror is located) while not being a source of irritating glare for the other cars. The retroforeflective insignias may be combined with other types of displays incorporated within mirrors whether these are EC mirrors or non EC mirrors. For example a mirror may have both the retroreflective insignia along with active insignias such as a set of angled light emitting diodes (LEDs) (available from Muth Mirror Systems, Sheboygan, Wis.) that shine through the mirror and are visible to the other cars in the vicinity (e.g., blinking turn signals) but are not visible and does not cause a visual distraction to the car driver which has this mirror.

Retroreflective reflectors and their construction will be described first, and then their incorporation in automotive mirrors (including EC mirrors), particularly exterior mirrors will be described.

Retroreflective reflectors can be formed in several ways. One way is to mold or etch a substrate so that it resembles an array or a set of corner cubes. When the surface of the corner cubes are coated with a reflective material, then these corner cubes direct the light in the same direction as the source. Another method that is commonly used is by using micro-spheres of transparent high refractive index materials (usually glasses and inorganic oxides with an RI of about 1.7 to 2.5, preferably above 1.8) which are coated on half of their surface (like a hemisphere) by a reflective coating. These spheres are then formulated in an ink which is deposited using standard printing methods (e.g., screen printing). If all of the coated part of the sphere is perfectly aligned with its normal perpendicular to the substrate, and the clear part facing the anticipated light direction, then this retroreflective material will have a very low divergence for the reflected light, and if this is random, as is typically the case if such spheres are deposited from an ink and no alignment methods are used, then the reflected beam diverges and does not cause the glare problem. Retroreflective coatings are used for traffic signs on the roads to increase their nighttime visibility by reflecting part of the light back from the headlights of an approaching car. Retroreflective materials and coatings are described in the literature. Some of the relevant U.S. patents for materials, compositions or microspheres and binding medium, printing, curing methods (UV or thermal) alignment methods (e.g., use of magnetic fields), etc are U.S. Pat. Nos. 2,963,378; 4,187,332; 5,981,113 and 7,175,901. A source of retroreflective paint is Nippon Carbide Industries USA (Santa Fe Springs, Calif.) which sell a variety of colors under the trade name NIKKALITET™. In order to custom make these inks, one can either make or purchase microspheres with half of their surfaces coated with reflective coatings. A source of such spheres is Cospheric located in Santa Barbara, Calif. Typically the average size of the microsphere for these applications is in the range of about 10 to 100 µm, and preferably in the range of about 30 to 60 µm. If colored spheres are used and/or the reflective coating is of different colors, then one can tailor the color of the reflected beam. One may also add phosphors to the ink compositions with retroreflective properties or even use spherical phosphor particles to make retroreflective materials so that both properties, i.e., emission and retroreflectivity can be combined in a single particle. One may also buy retroreflective media where retroreflective materials are deposited or formed on a substrate. These can be affixed to the automotive mirrors using an adhesive, or may come with an adhesive layer and a release layer, where the latter is peeled off and then this is mounted on a substrate. Retroreflective media (e.g. sheets and tapes) based on microbeads and microprisms are available from 3M (St. Paul, Minn.). Preferred materials will have retroreflective values above 10 cd/lux/m$^2$ when measured in an angular range of 0.5 to 4 degrees. More preferred materials will have a retroreflective value in excess of 100 cd/lux/m$^2$. It is preferred that the retroreflection be limited to about less than 15 degrees to the normal of the mirror (more preferably less than 10 degrees), so that the retroreflection is not visible to the driver of the car on which this feature is located.

Figure 5:
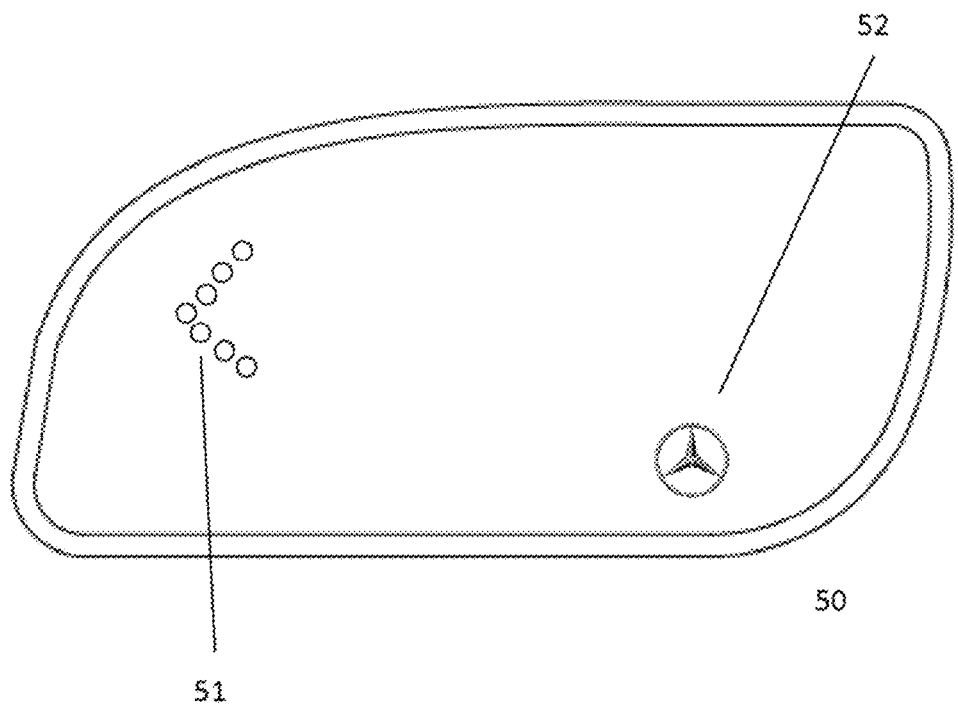
FIG. 5: This shows an exterior automotive mirror with a insignia of this invention in the reflective area of the mirror.

FIG. 5 shows an automotive exterior mirror 50 with an insignia 52 which is retroreflective and an optional turn signal 51 of Muth type all integrated in a mirror (or within the active area of the mirror or the glass substrate which is used to form the mirror). The mirror may be an electrochromic mirror or a regular first surface or a second surface mirror. There may be other types of insignia on this mirror as known in the prior art that may also be used. This may be a flat exterior mirror or a convex mirror, or a multi-radius mirror for the blind spot, or have a small convex area built into the mirror.

Figure 6:
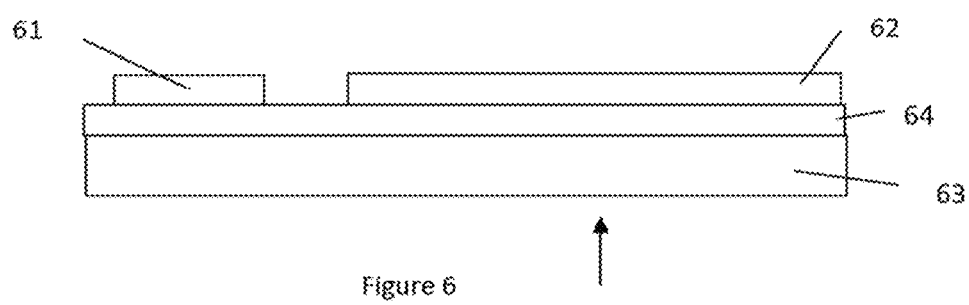
FIG. 6: Shows the cross-section of an automotive mirror showing incorporation of an insignia of this invention.

FIG. 6 shows how a retroreflective component is integrated on a mirror that is not electrochromic. The arrow shows the viewing side. The viewing side of the substrate 63 is the first surface and the rear surface of the substrate is the second surface. The retroreflective element may be printed or affixed on the first surface (viewing surface) or the second surface. A preferred arrangement is on the second surface behind a reflective coating which is semitransparent. Some examples of reflective coatings are silver, silicon, chromium, titanium, rhodium, aluminum and their alloys. The visible transparency (e.g. measured at 500 or 550 nm) of the reflective coating may be any that will serve the purpose, but typically transparency is in the range of about 1 to 20% Such reflective coating may be called as semitransparent or a transreflective coating. For exterior mirrors the reflectivity of the mirrors in the bleached state (if these are electrochromic (EC)), is in the range of about 30 to 60% and in the colored state from about 10 to 20%. The mirror shows a substrate 63, with a semitransparent reflective coating (transreflective) as 64, and the retroreflective insignia 62 that is printed or bonded to the said coating. 61 is an optional directional LED system for turn signals. The heater elements if used (not shown) can be integrated behind the insignia. The reflective coating 64 is shown as a second surface coating but this may also be deposited on the first surface. When the light falls on such a mirror, it is reflected away from the source at a different angle. Only the light that penetrates the mirror and is reflected from the retroreflective mirror 62, is directed back to the source. Thus the design or insignia with retroreflective properties is largely invisible to the driver of the car with this mirror.

Figure 7:
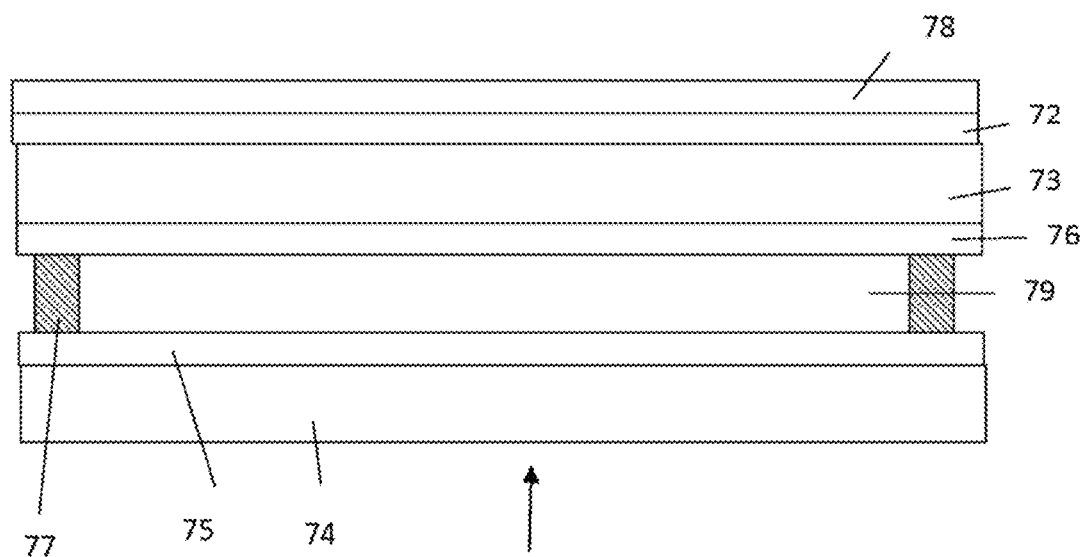
FIG. 7: Shows the cross-section of an electrochromic mirror showing incorporation of an insignia of this invention.

FIG. 7 shows a schematic of an EC mirror with a retroreflective insignia. The arrow shows the viewing side. This EC device shows two substrates 73 and 74 with conductive coatings 75 and 76 of which 75 is transparent. These substrates are sealed at the perimeter using an adhesive 77 and the cavity between them is filled with an electrolyte 79 (solid or liquid) which comprises of one or more electrochromic dyes. The outside surface of the front substrate is first surface, and the inside surface is second surface. The inside surface of the back substrate is surface 3 and the outside surface of the back substrate is surface 4. This EC mirror as shown is a third surface mirror, wherein the coating on surface 3 is both a reflector and a conductor. Further this reflector is partially transparent. Details of EC mirror constructions, some salient features, different EC layer thicknesses, their compositions and optical properties are well known and provided in several U.S. patents, some examples are U.S. Pat. No. 7,859,738; U.S. Pat. No. 7,738, 155; U.S. Pat. No. 7,733,555; U.S. Pat. No. 6,111,683 and U.S. Pat. No. 7,688,495, published U.S. patent application UA20110002028; published PCT application 2009099900/ WO-A2, all of which are included herein by reference. Layer 72 shows a retroreflective display mounted on the fourth surface and 78 is a heater layer. The layer 72 does not have to occupy the entire back of the mirror. In one way it is preferred that the active area of the device (i.e., the planar area inside of the perimeter seal) is occupied by the display. Even if the displayed area is smaller or has features, the rest of the area is simply a coating that fills in. This may be comprised of two coatings, where one has for example printed retroreflective features and then another coating to cover the back. This cover may also be a heater pad or heater coating. The reflective coating 76 is partially transparent as discussed earlier. One may also incorporate retroreflective mirrors in fourth surface EC mirrors, i.e., where coating 76 is transparent, and then there is an additional reflective coating interleafed between the substrate and the retroreflective reflector 72. Some of the fourth surface coatings are described in U.S. provisional application 61/431,567 filed on Jan. 11, 2011, which is included herein by reference. One could include other kinds of displays in this mirror including other fixed insignias, turn signals, etc. The first surface of these EC mirrors may have other coatings such as antireflective coatings, hydrophobic or hydrophilic coatings, etc., many of which are described in references discussed above. The retroreflective materials may also be combined in a conductive matrix and deposited as an insignia so that these are in contact with one of the conductive surfaces selected from 75 and 76.

Figure 8:
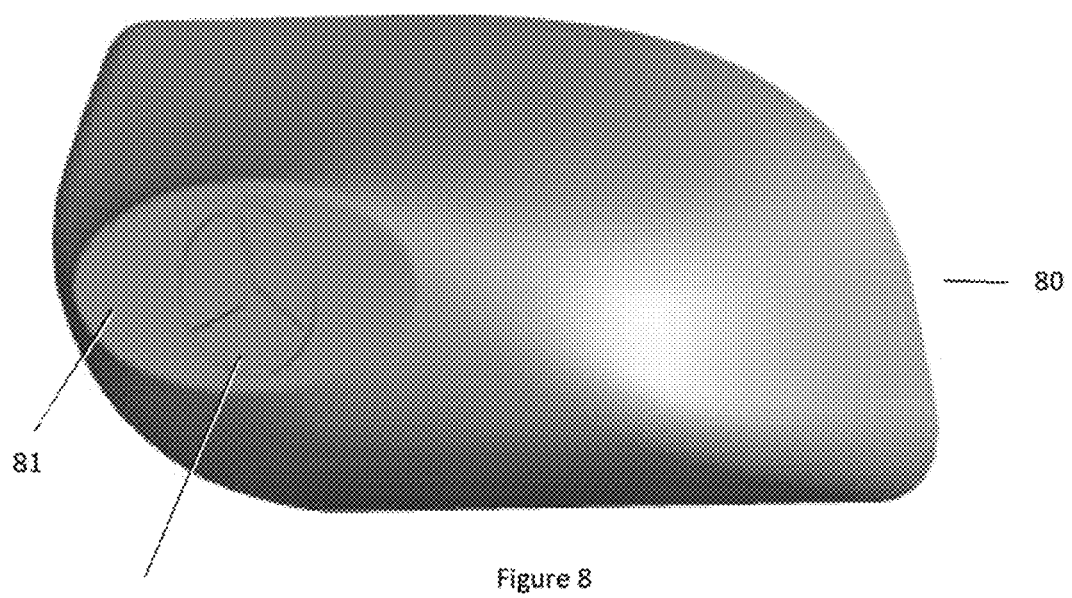
FIG. 8: shows an insignia of this invention on the back side of an exterior mirror housing.

Although molded retroreflective lenses are used on automobiles such as on tail lights, side lights and turn signals, but use of retroreflective insignias has not been done as discussed above or in the situations described below. For example use of retroreflective paints (or finishes) and elements on car insignias (includes badges, indicias, emblems, decals, pins, lapels, logo, hood ornaments, or model/make) make these stand out when these are illuminated by the trailing cars or cars coming from the opposite directions. These are usually located on the front grill, hood or the outside of the trunk area. Such insignia may also be assembled on the back side of the exterior mirror housings so that these stand out when radiated by the headlights of the approaching cars. FIG. 8 shows this concept where the back side of an exterior mirror case 80 is shown. This shows a flat area 81 on which a retroreflective insignia 82 is formed. For reducing the air drag, the insignia may be formed on the curved area (i.e., the flat area is eliminated). One can also form a transparent shape that is curved and encapsulates the flat area to reduce the drag. One method to form this would be to form the insignia on the flat part of the transparent part in an orientation so that when this is bonded to the flat part of the mirror case, the insignia has the correct handedness. The molded transparent part with the insignias can be placed in a mold where the cover is molded and simultaneously bonds and/or latches to the transparent part. In one embodiment, retroreflectors and/or luminescent insignia elements may be preformed (e.g., by molding or printing on a substrate) and then placed in a mold to form the back cover so that this is assembled into the cover as it is formed. One may also form these along with the housing by forming one component first—e.g., the retroreflector, without removing this from the mold and then injecting the material for the next component which in this case will be the housing (multi shot molding). For insignias, when molded retroreflectors are formed, then one may also incorporate luminescent materials within the resin used for molding these components, and further, it is preferred that the size of the molded features (such as the size of the molded corner cube within this insignia) is less than 2 mm, and preferably less than 1 mm. Further, these could be so designed so that these do not standout during the daytime or are visible both at nighttime and daytime using standard techniques discussed in the references cited earlier and as used for making traffic signs.

In particular, if imaging displays or light emitting indicators may be affixed to the back of the mirrors (e.g., displays that are connected to a camera to show the image of the area towards the rear of the car during reversing) using scatter prevention layers or additional layers or adhesives. These mirrors could fourth surface mirrors as described above or third surface mirrors. Preferred layers to affix the imaging sensors are flexible such as those based on acrylics, urethanes and silicones. If the displays are formed on flexible surface, they may also be placed behind curved mirrors (e.g., interior curved mirrors or the exterior curved mirrors) so that they can be bent to take the contour of the curved surface of the mirror. These layers may be colored to provide a color correction to the image. Unless there is light interference from any of the thin coatings used to make these, mirrors (e.g., interior mirrors), these adhesives do not have to be colored, as typically the EC mirrors are disabled (or are in clear state) when the vehicle is being driven in reverse gear, thus such mirrors do not contribute to a color in the image. For other imaging applications (for example to convey additional information to the driver, or warn the driver of a potential hazard, or an image of the rear compartment of the car, etc.), one may also actively compensate for color coming from the mirror in front of the display by using electronic signal processing means, by having a optical sensor placed next to the display that monitors the light transmission through the mirror and comparing it with another sensor that does not sense the light through the mirror. This sensor for color correction may even be the glare sensor used to activate the EC mirror. Electronic correction to the image may be optionally used if the display is bent to accommodate the mirror curvature.

For interior rearview mirrors where the display is put behind the EC cell, such display is only visible, when the user activates this display (display on demand), e.g., to see the image of the area behind the car during reversing, and then in the non-activated state the user only perceives that the entire mirror is a reflector as is the case for a rearview mirror. Thus, this display is viewed through the mirror element. Such display and system is described in U.S. Pat. No. 7,906,756, which is included herein by reference. The reflective layer has a transparency in the range of about 1 to 20% and is deposited either on the third or the fourth surface. The display is located behind the substrate with the transreflective layer and is bonded to it. For third surface mirrors, in order to reduce reflection from the interfaces, the refractive index (RI) of the bonding medium should be either matching to the EC mirror substrate that it is bonded to, or matching to the RI of the surface of the display or between these two RIs. As described later, additional coatings may be put behind the transreflector to decrease the reflectivity from this transreflective layer back into the display. Although during reversing of an automobile, the EC coloration of the mirror is disabled (i.e., it is in the bleached state), i.e., the display does not have to compensate for the EC mirror darkening, but there may be situations (e.g. a compass display, or a temperature display, etc.) when the display is used for a purpose, where its intensity may be modulated to take into account the depth of the darkening of the EC cell and also the ambient conditions (e.g., if it is daytime or nighttime). In the daytime, depending on the ambient intensity near the mirror, or if there is glare in the mirror from a trailing car at nighttime, the intensity of the display may be modulated for comfortable viewing by the user (e.g. at about 700 to 800 candelas/m$^2$). The sensors for the detection of the ambient light and the glare are located near the mirror, and usually the ambient sensor faces forward looking through the windshield and the glare sensor is facing backward looking through the rear auto window. There may be additional sensors as well. These sensors including imagers may be silicon photodiodes or may be formed using organic materials. These sensors may also be connected with conventional circuits within the mirror case, and the sensors may comprise of additional components for amplification, power conditioning, etc. Typically, the output of the sensors is converted to a signal that is then compared by a microprocessor (which may also be integrated with the sensors on the same board) and then establishes a reflectance level for the mirror. This or another microprocessor will have a memory (with look up tables corresponding with driving voltage schemes and reflectance level characteristics of the mirror) or logic to translate the desired reflectance level into an appropriate voltage signal to drive the mirror. The display element may comprise a self emitting display such as an electroluminescent display or organic light transmitting diode (OLED), or a passive display with backlight, such as (thin film transistor) TFT liquid crystal display video screen backlit by at least one white light emitting diode. Such displays also are integrated with mechanisms to adjust the intensity control for comfortable viewing by the automobile occupants. The intensity of the display is also modulated in response to the ambient light level, glare light level, and the state of coloration of the electrochromic cell. Many of the sensors can show sensitivity to temperature and humidity, and compensation against this may be built within the sensor package or within the control structure. Also, if the displays are viewed through the EC mirror in various stages of coloration, the display may also be equipped with active color correction depending on the state or the level of coloration of the EC mirror, as the color coordinates of the light passing the EC cell change with darkening. The color correction would keep the image colors closer to their truer colors.

One may add antireflection layers behind the transreflective layer on the fourth surface of an EC mirror so as to reduce reflectivity of light back into the display and increase the transmission of light directed from behind the mirror (e.g. emanating from a display located behind the mirror). These concepts may also be used to put display behind mirrors formed from a single substrate (and may not have an EC functionality including prismatic mirrors) where the reflector is located on the back of this substrate. This increase can be in a broad wavelength range or it may be at specific wavelengths to match the wavelength of the light from the display. Such layers that are put behind the third surface reflective EC mirrors has been described in published U.S. patent application 2009/0116097 which is included herein by reference. FIGS. 10a and 10b shows schematics of the layer of the rear substrate for an EC mirror. A complete EC mirror can be made using such a rear substrate when combined with a front substrate as shown in FIG. 4b. In FIGS. 10a and 10b, the ITO (or transparent conductor) coated side of the substrate 101a will be 100a, which is on the third surface in the mirror configuration. The rear surface of this substrate or the fourth surface in the mirror configuration will have reflective and other coatings as discussed below. To get accurate light reflection and transmission numbers the entire mirror with both the surfaces should be modeled. However, to illustrate our point of customizing the stack on the rear surface of the rear substrate of the EC mirror, the other substrate and the electrolyte layer is not shown. In both figures (FIGS. 10a and 10b), substrate 101a on the rear surface is coated with a reflective layer 102a (e.g., aluminum and its alloys) and then coated with a clear protective layer 103a (e.g., silicon nitride, titanium dioxide, tin oxide, ITO, silica). Additional materials for reflectors and transparent protective coatings are provided in the earlier section on fourth surface reflectors. Layer 104a is glue (silicone, acrylic, polyurethane, epoxy, poly vinyl butyral, polyvinyl acetate) or a laminating polymeric layer to bond the front display substrate shown as 105a in place. As shown in FIG. 4b, the reflective layer 102a may be deposited through a mask leaving a perimeter ring, so that the layer 102a is not exposed at the edges after coating 103a is deposited. FIG. 10b shows additional layers 106a and 107a sequentially deposited on Layer 103a. 106a is another reflective layer made out of the same material as in 104a or a different material, and 107a is a clear material and may be of the same material as layer 103a. The arrows in both figures show the direction of the light from the display. A part of this light is transmitted through the complete EC mirror that is viewed by the user.

Reflectivity and transmission of such layers could be modeled by using standard optical software. The simulation below was done using Zemax® software, from Radiant ZEMAX LLC, Bellevue, Wash. In the model, the substrate for mirror and the display respectively (101a and 105a) is same type of glass (or with similar optical properties), reflector layers (102a and 106a) are aluminum, clear layers (103a and 107a) are silicon nitride (SiN), the glue (layer 104a) is a polymeric material with some aromaticity. In this model, we used the following values of the refractive index (n) and extinction coefficient (k) at a wavelength of 550 nm.

| Material | n | k |
|---|---|---|
| Glass | 1.52 | 0 |
| ITO | 2.00 | −0.0075 |
| Aluminum | 0.7 | −7.0 |
| SiN | 2.016 | 0 |
| Chrome | 2.965 | −4.43 |
| Titanium | 1.86 | −2.56 |
| Glue | 1.548 | 0 |

A 2 mm thick rear glass substrate to be used in the EC cell, where its front is coated with ITO (150 nm) and the back (or the fourth surface as in the mirror) is coated with 18 nm (or 0.018 µm) layer of aluminum has the following properties using the above material parameters. When the light is incident from the front, i.e., from the ITO side, at 550 nm, it transmits 2.5%, absorbs 15.6% and reflects 81.9% of light. When the thickness of aluminum layer is increased to 100 nm, then the reflection is 88.9%, and is largely opaque to transmission as the rest of the light is absorbed. In case the glass did not have an ITO coating, the through glass reflectivity from the front side (non-coated side) would have been 91.9% for 100 nm thick aluminum. When the thickness of the ITO was changed to half wave (thickness 138 nm) at a wavelength of 550 nm, then the reflectivity for 18 nm thick aluminum was 82.3% and for 100 nm aluminum it was 87.3%.

In many cases when thin metallic films are put on substrates, sometimes additional layers are put between the metal and the substrate to improve adhesion. For improving adhesion of metal to glass generally a thin layer of titanium or chrome is deposited, before the deposition of the second layer, such as aluminum. When a 10 nm thick chrome layer or a titanium layer is put between aluminum and glass, the reflectivity of light at 550 nm incident from the ITO side is shown in the table below. The results show that the change in the reflective properties with this change is more for chromium as compared to titanium.

| Chrome thickness, nm | Titanium thickness, nm | Aluminum thickness, nm | Reflectivity, % | Transmission, % |
|---|---|---|---|---|
| 0 | 0 | 18 | 81.9 | 2.5 |
| 0 | 0 | 100 | 86.9 | 0 |
| 5 | 0 | 18 | 69.4 | 1.6 |
| 5 | 0 | 100 | 73.6 | 0 |
| 0 | 5 | 18 | 76.1 | 2.1 |
| 0 | 5 | 100 | 80.8 | 0 |

In another simulation a 2 mm thick rear glass substrate coated with ITO (150 nm) on the front side and coated with aluminum on the rear side as described above (18 nm thick layer) was modeled by adding a protective silicon nitride layer and gluing (glue thickness 0.2 mm) a display with a front glass in a thickness of 1 mm. This is for a case where a display is expected to be located on the back of the rear substrate and further, the aluminum coating on the rear substrate is protected by a layer of silicon nitride. This stack is shown in FIG. 10a.

| Number (FIG. 10a) | Material | Thickness (µm) |
|---|---|---|
| 100a | ITO | 0.150 µm |
| 101a | Glass (back substrate) | 2.00 mm |
| 102a | Aluminum | 0.018 µm |
| 103a | Silicon Nitride (SiN) | 0.0560 µm |
| 104a | Glue | 0.20 mm |
| 105a | Glass (display) | 1.00 mm |

The display has a 1 mm thick glass which is bonded to the silicon nitride layer 103a, using the glue layer 104a. When the light from the display is incident on this side of the substrate (see arrows in FIG. 10a), the light transmission is 5.5%, absorption is 16.5% and reflection of light back into the display is 78%, all at 550 nm.

In another case, the stack in FIG. 10a was modified by changing the silicon nitride layer thickness (layer 104a), and by adding another two layers behind this silicon nitride layer. These layers have the effect of providing antireflective properties to the light coming from the display, while also improving the transmittance. These layers were another reflective (aluminum) layer (106a) in a thickness of 6 nm and another silicon nitride layer (107a) in a thickness of 102 nm. This layer sequence is schematically shown in FIG. 10b.

| Number (FIG. 10b) | Material | Thickness (µm) |
|---|---|---|
| 100a | ITO | 0.150 µm |
| 101a | Glass (back substrate) | 2.00 mm |
| 102a | Aluminum | 0.018 µm |
| 103a | Silicon Nitride (SiN) | 0.102 µm |
| 106a | Aluminum | 0.006 µm |
| 107a | Silicon Nitride (SiN) | 0.12 µm |
| 104a | Glue | 0.200 mm |
| 105a | Glass (display) | 1.00 mm |

The modeling results show that as compared to the earlier case, the light transmission at 550 nm from the display through the stack increased to 10.1%, absorption was 82.8% and reflection back into the display decreased to 7.1%. By increasing the thickness of the aluminum layer 102a from 0.018 µm to 0.025 µm, the transmission at 550 nm from the display through the stack is 3.5%, the reflection back is 8.3% and the absorption 88.2%. With this change, the reflection of the stack when looking from the front (ITO side) goes from 68.3% to 80.4%.

Layer sequences with less than 20% reflection back into the display are highly preferred. In any of these models the dielectric layer can be changed from silicon nitride, the two metal layers may be different from each other, and other metals other than aluminum may be used. Such layers can be optimized based on the layer compositions, thickness and sequence to get a combination of properties such as reflectivity from the front, transmission from the rear and also the color. A selection of materials for the reflective layers and dielectric layers was given in the previous section on fourth surface reflectors. In addition, the layer 106a may also be chosen from those comprising nickel, niobium, tantalum and those materials with high absorption coefficients in specific wavelengths in the visible optical range to provide color for example copper, gold, and their alloys. One may even substitute each layer with more than one layer each with a different composition. Also as shown in FIG. 4b, when a number of layers are used, the last layer (layer 48 in this case), which is preferably a stable dielectric can be deposited so that it covers the edges of the previous layers for superior environmental protection. In FIGS. 10a and 10b the adhesion promoting layer between the substrate 101a and the first metal layer 102a is not shown, although this can be incorporated.

The displays in the mirrors in the automobiles may also include a feature that includes showing the direction of a place of interest on Earth, which is different than usually showing a navigable path towards an address. Typically, this direction is shown relative to the orientation of the vehicle. One method to decide on the reference orientation of the vehicle is the direction in which its front end is oriented in. Clearly, one may use any other convenient reference. This feature may also make use of the GPS and/or compass system to determine the directional location of this place of interest. This feature may also help the user to align the vehicle towards the specific location of interest. As an example, the car may be in a parking area, where the car is moved or turned to align with this direction. This feature is not to show a navigable path to the location (which may be a separate option) but only to display its direction relative to the vehicle. This is not similar to pointing towards generic geographic locations such as North, South, East, West, but instead pointing to a specific location on the earth which is not these geographic directions. Further, the direction of the front of the car relative to the desired location may be displayed using any desired markers, so that the driver is able to compare the direction of the car front to the direction of the desired location, and optionally be able to turn or rotate or change the direction of car so that these directional signals coincide showing that the car is now pointed towards the desired location. This alignment may be coupled to a voice tone. The coordinates of the locations of interest may be pre-programmed or may be downloaded through an internet connection or other means. This feature facilitates the user with additional utility, such as in performing religious activities. Some examples of these locations are Amritsar (India), Bodhgaya (India), Bethlehem (Israel), Jerusalem (Israel), Kashi (India), Mecca (Saudi Arabia), Palitana (India), Salt Lake City (USA), Vatican and Vrindavan (India). When one is close to these locations, then one may point towards a specific location or such as a specific object or a temple, mosque, church or a synagogue within these towns, which in the context of this invention is analogous to pointing at the above mentioned towns. One may even designate more specific locations within these destinations. This feature may also be useful for those instances where there are no navigable paths in wilderness, but will allow the user in understanding the direction of the vehicle relative to a desired location. This feature is different from the usual application of such devices which either point towards a direction, such as North, South, East, West, etc. or provide a route guidance to reach a certain location. In addition, it is preferable to use the International Date Line (IDL) as the reference, to decide the boundary between the East and the West. For example a vehicle located east of the IDL, e.g., in Mexico will point towards easterly direction if pointing towards Mecca, and similarly a vehicle located west of the IDL, say in Taiwan would point in the westerly direction when pointing towards Mecca. It is useful to provide an indicator in the vehicle e.g., in the rearview mirror (including an electrochromic mirror) or anywhere else to be able to point towards a desired location without seeking a navigable path towards that (e.g., Qibla compass). However, as a separate feature, this may be optionally tied to a navigation system to show the path towards this. The display may have additional features with or without this directional device, such as a programmable alarm clock, voice or music recordings to be played at specific times or even the use of a video player. For safety, the video player if provided should preferably be automatically deactivated in a moving car if this has the potential to be viewed by the driver. Such displays may be located within the automotive mirrors, or may be part of a dashboard mounted display.

Figure 11:
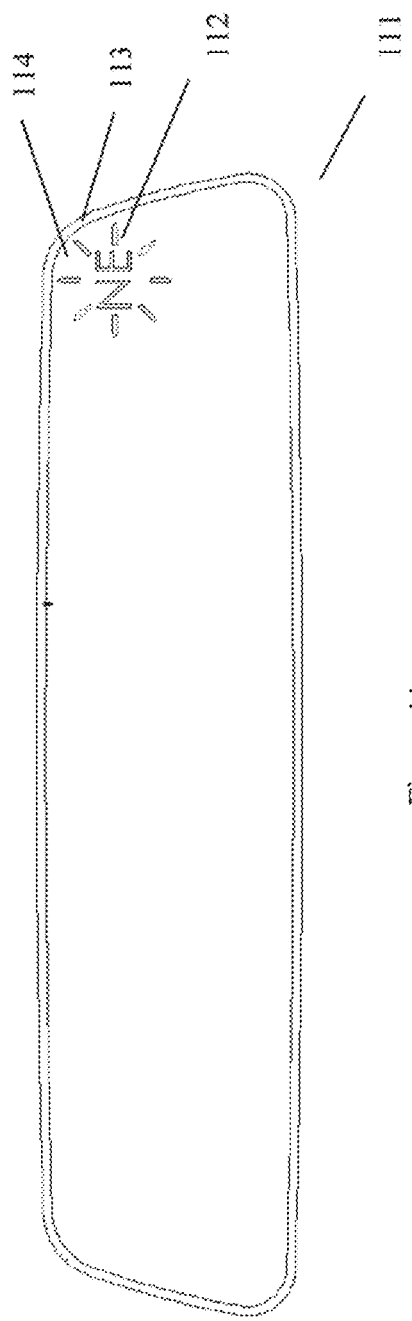
FIG. 11: shows a schematic of the cross-section of an automotive rearview mirror with a compass display and a display showing a location of specific interest.

This concept of display implementation is shown schematically in FIG. 11. This figure shows an interior automotive mirror 111. This may be an electrochromic or a non-electrochromic mirror. The display may be "display on demand", i.e., hidden behind a reflector and is only visible when lighted, or the reflector may be etched, so that a window is visible, but the displayed information is only visible when the display is turned on. This figure shows a compass display 112 showing that the vehicle is headed or oriented towards the Northeast (NE) direction. Around this displayed information, are shown eight direction display markers, of which two are identified as 113 and 114. When the display is on, then preferably only one of any of these markers is lighted pointing in the direction of the specific place which the user is interested in or has been programmed. Alternatively, one may light up all of these but for one use a different intensity or color, or a blinking signal to convey to the user the direction of interest. There could be many more directional markers if a higher resolution is required. Also, in an alternative implementation, directional marker 113 may be taken as the nominal direction for the car orientation (which is also shown in the display as Northeast using letters NE) and may be lit in first color. One of the other direction marker e.g., 114, is also lit in second color (different from the first color) pointing towards the place of interest. When the direction of the car orientation and the place of interest coincide, then 113 is only lit in the second color, or it starts blinking, or may blink by alternating between the first and the second color to convey to the user that the vehicle is now pointed in the direction of interest. It is not necessary that a geographic directional display must be integrated along with a directional display or feature for the place of interest. Further the directional display feature for the place of interest may be integrated with any other display on the mirror or it may be a stand-alone display. As shown in FIG. 9, this feature could be integrated with the display and the electronics. This is integrated within the mirror housing or some of the inputs such as GPS signal, may be obtained from outside of the housing.

Such display integration including the use of antireflective layer may also be used for prismatic day/night mirrors, wherein, the traditional silver reflective coating protected by a copper layer and paint is substituted by transreflective and other layers to protect the transreflective layer from corrosion and/or reduce reflection from displays placed behind the mirrors.

In one of the implementation (e.g., programming alarms or geographic locations) a user interface is required to program the mirror or exchange data. A user interface may be provided on the mirror casing using capacitive switches as disclosed earlier. However, one may also provide a user interface anywhere in the vehicle. A desired method of providing a superior interface at low cost would be using a smart phone that would wirelessly communicate with a transceiver which may be optionally located in the mirror housing. The communication may occur through a Bluetooth (Bluetooth SIG Inc, Kirkland Wash.) protocol or near field communication (NFC). The International Organization for Standardization (ISO) and the International Electrotechnical Commission (IEC) standard 14443 governs the NFC protocol. An app can be provided for the smart phone which would identify a unique code in the mirror and then communicate. Using one of these communication protocols one may use the smart phone to communicate with a mirror equipped with a microphone and a speaker related to a hands free phone conversation or relaying music, or security related issues, but may also act as an additional device for many additional features, such as video recording device from the cameras located oin the mirror, which may be forward and/or backward facing. Currently, Near Field Communication, or NFC, is a set of short-range wireless technologies, typically requiring a distance of 20 cm or less. NFC operates at 13.56 MHz and at rates ranging from 106 kbit/s to 848 kbit/s. NFC always involves an initiator and a target; the initiator actively generates an RF field that can power a passive target. This enables NFC targets to take very simple form factors such as tags, stickers, key fobs, or cards that do not require batteries. NFC peer-to-peer communication is also possible, where both devices are powered. Currently, Bluetooth communicates between 2.4 and 2.5 GHz with distances up to 20 m at a maximum rate of 2.1 Mbit/s.

Wireless Powered Mirrors:

There are several methods to provide power to the automotive rearview mirrors to undertake powering of various electronic functions (communications, sensors, indicators, displays or electrochromic functionality for electrochromic mirrors) without hard wiring these to the power source from elsewhere in the car. These mirrors have an energy harvesting unit located within the mirror (mirror includes mirror housing), which are able to harvest energy from the environment around them and convert that to electrical energy. Such mirrors are particularly useful for the retrofit market. Use of battery power in the mirror is known (e.g., see U.S. 20110051219), however, such batteries have to be either replaced or charged periodically. If rechargeable or secondary batteries are used, then their charging without attaching a charger connected to another power source with conductive wires to the mirror assembly is not known. Communications include telecommunications, or communication with other components of the automobile to record and execute a command, or to receive feedback on some other function. Some examples are provided. As an example, if the interior automotive mirror is wireless with its own power source as described below, and has EC functionality (variable reflective element) that is automatically triggered (coloring or bleaching action) by sensors located in the housing, this signal may be communicated to the outside EC mirrors (variable reflective elements) for them to follow the same. As another example, if a sensor mounted on the outside mirror or other part of the vehicle generates a warning to the driver to not to change a lane, then a warning visual or audible may be generated by the interior mirror based on a wireless signal received from this sensor. Another example of the signal may be a temperature signal originating from the outside or the inside of the automobile. In another example, when the car is put in a reverse gear, a wireless signal is sent to the EC mirrors to not to activate the EC functionality. Yet in another example a camera located in the rear of the car may transmit a video image signal wirelessly to the interior mirror (e.g., when the car is being reversed) which is then shown in the video located in the mirror housing. Yet another example may be a signal being sent from interior to exterior mirrors to change their reflectivity.

One can use several charging (energy harvesting) mechanisms and use it in conjunction with a power storage component (such as battery or a capacitor) located inside the rearview mirror (i.e., mirror housing), or one may also provide power to various functions directly without the use of a power storage component. Use of power storage component is preferred. The energy can be harvested from one or more of the various environmental factors surrounding the mirror, e.g., light, heat (differential temperature), sound (including ultrasonic), air flow, mechanical vibrations, electromagnetic waves, pressure, etc. The power source to harvest energy from light could be a solar cell located on the mirror housing (e.g., for interior mirrors this may be located on the back of the housing facing the windshield in order to get plenty of light for charging). This solar cell may also be optionally used as one of the sensors (a substitute for the forward facing sensor) for an EC mirror to determine if it is daytime or nighttime while working in conjunction with the rear facing sensor. Another option is to make use of piezo-electric or other devices that convert mechanical energy from the motion and or vibrations of the car when the engine and/or the car is running. Tapping into electromagnetic radiation is another option, and one may use specific electronics to wirelessly provide power by induction. For example, one method of transferring power via RF is described in U.S. Patent Publication 2007/0191074, entitled "Power Transmission Network and Method". In other embodiments, power is transferred via magnetic induction using a first resonator powered by an external power supply and a second resonator which converts the magnetic field energy created by the first resonator into power that is supplied wirelessly into the mirror housing. Such magnetic induction is described in U.S. Patent Publication 2007/0222542, entitled "Wireless Non-radiative Energy Transfer". Another method of providing wireless inductive power is described in U.S. Pat. No. 7,382,636, entitled "System and Method for Powering a Load". Another publication describing this technology is US2011/0148218, entitled "Wireless Powered Electrochromic Windows", all of which are included herein by reference.

For use in mirrors, the most preferred energy harvesting components are based on vibration, light and electromagnetic radiation. The vibration energy harvesters are preferably functional in a range of about 20 to 150 Hz, although any frequency of interest may be used. Vibration based harvesters may be located in areas where the vibratory motion is high, as an example away from the center toward the left and the right edges of an interior mirror or the mirror edge that is far from the car body for exterior mirrors. There may be more than one energy harvester located in a mirror. When more than one energy harvester is used, then these may use similar or different mechanisms of energy harvesting. A source of information and several suppliers of energy harvesting modules, signal conditioners, electronics is available from the Energy Harvesting Forum (http://www.energyharvesting.net/ accessed on Dec. 7, 2011, Energy Harvesting Forum is created by Power Sources Manufacturers Association, Mendham, N.J.).

Figure 12:
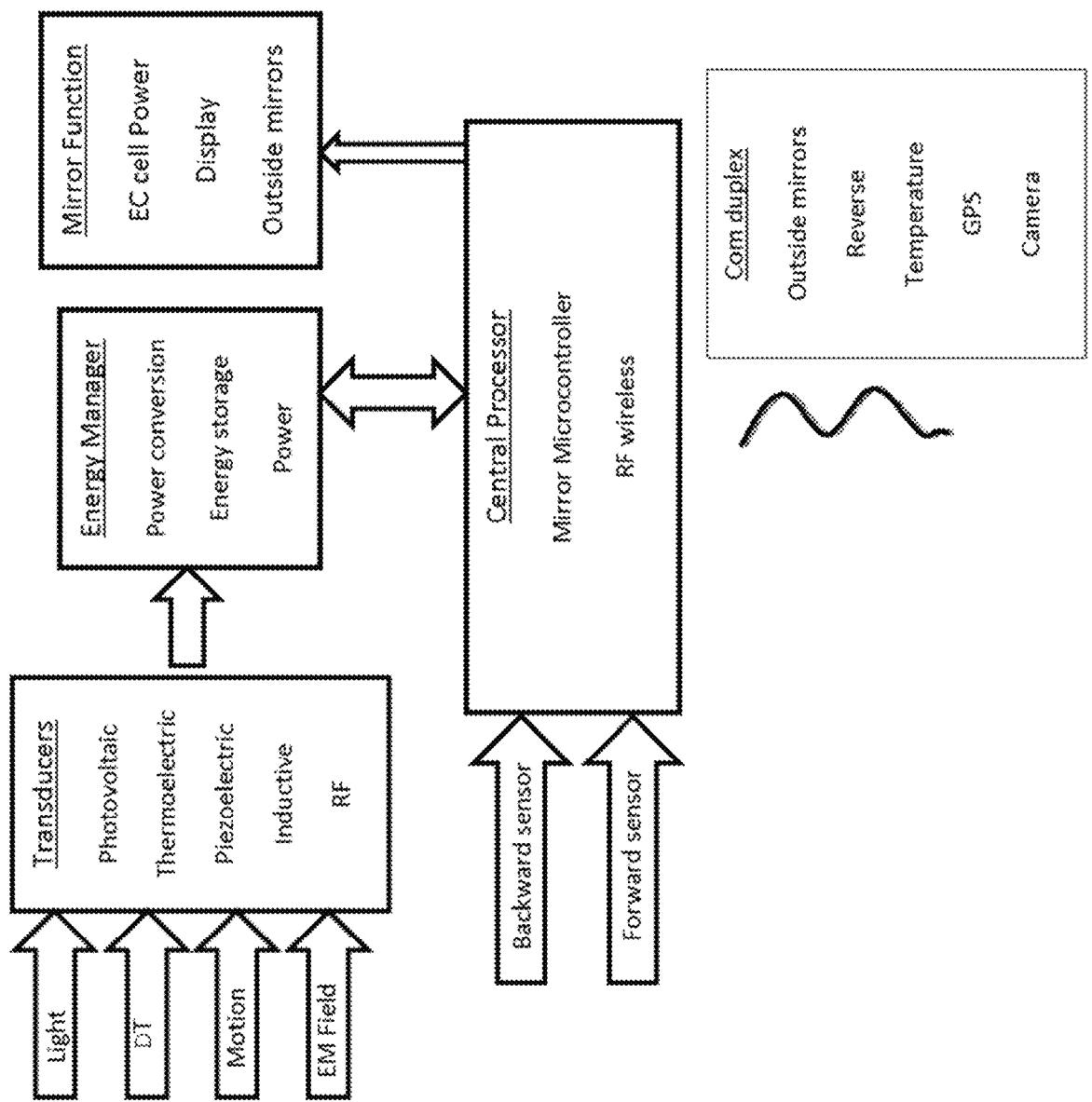
FIG. 12: Schematics of functions of a rear-view mirror comprising an energy harvesting unit.
Figure 13:
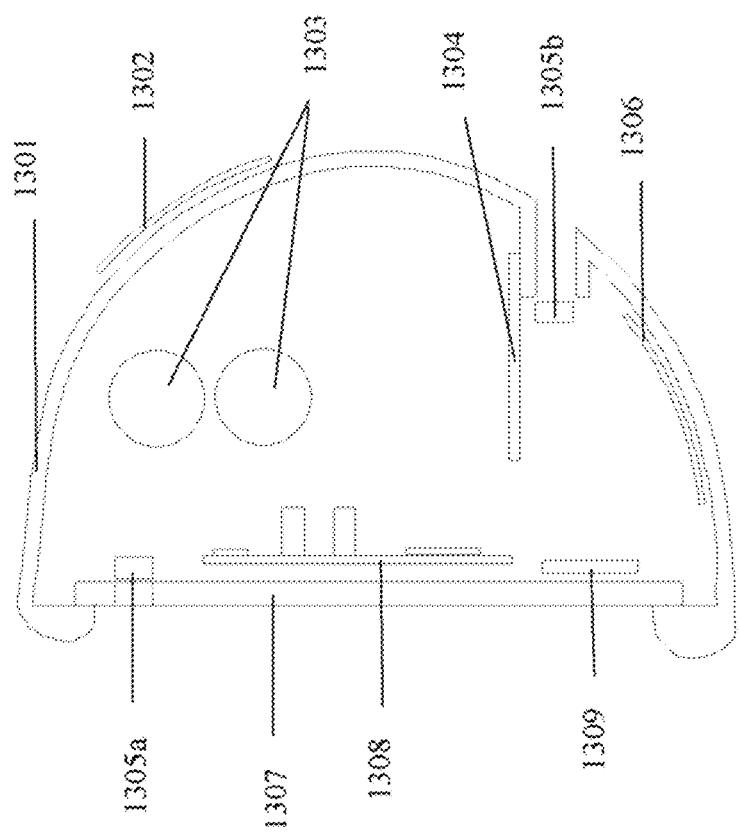
FIG. 13: Schematics of an electrochromic interior rearview mirror comprising an energy harvesting unit.

FIG. 12 shows a schematics of a mirror electronics with an energy harvesting module. One or more of the "transducers" are placed into a rear view mirror assembly, e.g., those activated by light (photovoltaic), differential temperature (DT) (thermoelectric), motion (piezoelectric) or those that harvest energy from electromagnetic (EM) radiation (such as inductive or radio frequency based sensors). The electrical energy outputted from this is then directed towards the "Energy Manager" module. The output of the energy harvesters has to conditioned before feeding the storage devices or circuits. For example, for piezoelectric energy harvesters one can use the EHE004 from MIDE Engineering Smart Technologies of Medford, Mass. (or, e.g., ALD EH4205 and ALD4295 from Advanced Linear Devices (Sunnyvale, Calif.)) which converts the AC output power from a piezoelectric module to a regulated DC output that can be configured to discrete voltages from 1.8V to 3.6V. Also, a pulse power board like the EHE002 from the same company maximizes harvesting output by means of load isolation and matching. A switching converter produces a pulsed, voltage regulated output for battery or super capacitor charging. As another example, the same line of products (Volture™) includes the module SEH25W that combines piezoelectric and solar harvesting with a simple rectification circuit. As examples of storage devices, the "EnerPak" from TPL Inc. of Albuquerque N. Mex. power management system optimally extracts energy from different types of energy harvesters and efficiently manages the utilization of the extracted energy. It uses a combination of optimally sized super capacitors and rechargeable batteries. This devices can deliver both the peak and sustained power levels. The Energy Manager module also houses an energy storage unit (e.g. rechargeable batteries, capacitor, etc.) which then supplies the power to a "central processor" to carry out all of the functions. For an EC mirror, the central processor also receives the signal from the various optical transducers to determine if it is nighttime and there is a glare from the back. If there is glare then it powers the EC mirror cell to reduce the glare. This microprocessor also receives other signals, preferably wirelessly (unless the sensor is mounted within the mirror housing), such as from sensors on outside mirrors (e.g., lane departure warning, if the car has been put in reverse, outside temperature, GPS signals or signals from rear-view cameras, or any other information, which then needs to generate a warning (audible, visible) through an indicator or a display mounted on the mirror, or a signal to be sent to the outside mirrors for them to be activated (e.g., EC function)). FIG. 13 shows the schematics of such a mirror assembly mounted inside the car. The mirror housing is shown as 1301. The EC cell element is 1307 and the forward and the backward light sensors are respectively 1305b and 1305a. This mirror shows three energy harvesters, a photovoltaic cell 1302 that converts light coming in through the windshield, a vibration transducer 1304 and an RF transducer 1306. It is not necessary to have more than one harvester. These are then connected to appropriate electronics and communicate with the energy storage system 1303. The output of the energy harvesters has to be conditioned before feeding the storage devices or circuits. For example, for piezoelectric energy harvesters one can use the EHE004 from MIDE Engineering Smart Technologies of Medford Mass., which converts the AC output power from a piezoelectric module to a regulated DC output that can be configured to discrete voltages from 1.8V to 3.6V. Also, a pulse power board like the EHE002 from the same company maximizes harvesting output by means of load isolation and matching. A switching converter produces a pulsed, voltage regulated output for battery or super capacitor charging. As another example, the same line of products (Volture™) includes the module SEH25W that combines piezoelectric and solar harvesting with a simple rectification circuit. As examples of storage devices, the "EnerPak" from TPL Inc. of Albuquerque N. Mex. power management system optimally extracts energy from different types of energy harvesters and efficiently manages the utilization of the extracted energy. It uses a combination of optimally sized super capacitors and rechargeable batteries. These devices can deliver both the peak and sustained power levels. This provides power to drive all of the electronics or central controller shown as 1308. This also communicates to receive and send signals to outside devices, such as a camera, outside mirrors, headlight controller, rain sensor (not shown). In addition, this provides the power to change the reflectivity of the variable reflective element (in case element 1307 is a variable reflective element, such as an EC cell) and any display or indicator shown collectively as 1309 (which may also include an indicator to show the state of charge of the energy storage unit). The various elements inside the mirror may be connected by wires or by printed traces as discussed earlier. All of the electronics for central controller and other transducer and energy conversion functions may be integrated on the central board 1308, and in fact many of the transducers along with energy storage devices may be placed on this board. Although the above embodiment is preferred for retrofit mirrors, and in some cases, for the wireless mirror, one may also place several of the energy consuming processing functions outside of the mirror (e.g., in the header area, dashboard, etc.) which then communicates wirelessly with the mirror functions. As an example, part of the central controller which receives input from various sensors (e.g., camera) is not located in the mirror, but only communicates with the mirror with a processed signal to display this information.

EXAMPLES

Example 1

Preparation of High RI
(Triphenyloctylphosphonium Imide) Ionic Liquid

In order to prepare the ionic liquid first the intermediate salt triphenyloctylphosphonium bromide was formed as follows:

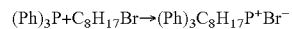

$(Ph)_3P + C_8H_{17}Br \rightarrow (Ph)_3C_8H_{17}P^+Br^-$

To a sure seal bottle was added 1.0 g (0.003813 moles) of triphenylphosphine and 0.7363 g (0.003813 moles) of n-octyl bromide. The bottle was sealed and placed in an oven at 83° C. for one hour. This was shaken and the solution was then heated to 130° C. for one hour and cooled to room temperature to form a clear colorless solid with a melting point of 60° C. FTIR analysis of the product was consistent with formation of triphenyloctylphosphonium bromide with the peaks due to C—Br stretch at 646 and 564 cm$^{-1}$ disappearing and a new peak appearing at 795 cm$^{-1}$ due to the formation of phosphorous alkyl bond. The material had a refractive index at 25° C. of 1.63.

The ionic liquid was prepared from the above intermediate as follows

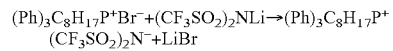

$(Ph)_3C_8H_{17}P^+Br^- + (CF_3SO_2)_2NLi \rightarrow (Ph)_3C_8H_{17}P^+ (CF_3SO_2)_2N^- + LiBr$ 10.43 g (0.0229 moles) of the intermediate salt $(Ph)_3 C_8H_{17}P^+Br^-$ was placed in a flask and 41 ml of deionized water added. Mixture was stirred at room temperature until a white turbid mixture formed. To this was added excess (0.0284 moles) of lithium trifluoromethanesulfonyl imide and the mixture stirred at 25° C. for one hour. It was then heated to 70° C. for one hour to form a two phase mixture. The bottom oily phase of the hydrophobic ionic liquid was separated from the top aqueous phase in a separation funnel. This was washed several times with de-ionized water and dried at 70° C. on a rotavap. The product was then dried at 120° C. under ambient atmosphere for 30 minutes and filtered through 0.7 µm glass filter. The yield was 87% and product was a clear colorless liquid. The refractive index at 25° C. was 1.54.

The above prepared ionic liquid was mixed with different amount of propylene carbonate (by volume) to show that the refractive index can be tailored as demonstrated in the table below.

| Ttriphenyloctylphosphonium imide, % Vol | Propylene carbonate, % Vol | Refractive index at 25° C. |
|---|---|---|
| 100 | 0 | 1.54 |
| 85 | 15 | 1.53 |
| 80 | 20 | 1.51 |
| 0 | 100 | 1.42 |

Example 2

Electrochromic Cell with Electrolyte of Refractive Index of 1.53

A cell cavity was prepared using ITO glass electrodes with a sheet resistance of 15 ohms/square and a cell gap of 75 microns. The cell was filled with electrolyte composed of 85 volume % triphenyloctylphosphonium imide ionic liquid and 15 volume % propylene carbonate (for electrolytic solvent, see Example 1) and 0.05 molar concentration of the electrochromic dye 4-4' bipyridinium1, (4(Ferroceneyl butyl), 1 methyl 1,1,1-trifluoro-N-[(trifluoromethyl)sulfonyl]methanesulfonamide (Fc-Vio Im). No change in RI was seen after the dye was added to the electrolytic solvent. The cell was colored at 1.2 volts and had a leakage current of 10 µA/cm². At 550 nm it had an initial % transmission of 78% and when colored after 60 seconds the transmission dropped to 49% and after 120 seconds to 39%.

Example 3

Porous Spacers in Electrolytes

Figure 3A:
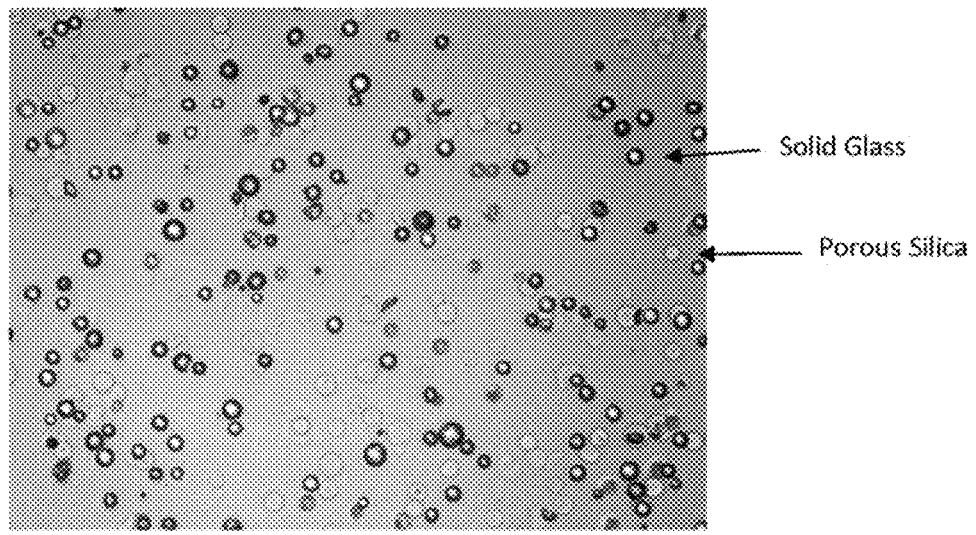
FIG. 3a: A micrograph from an optical microscope showing contrast between a solid glass spacer and a porous glass spacer in an electrolytic solvent used for electrochromic devices.
Figure 3B:
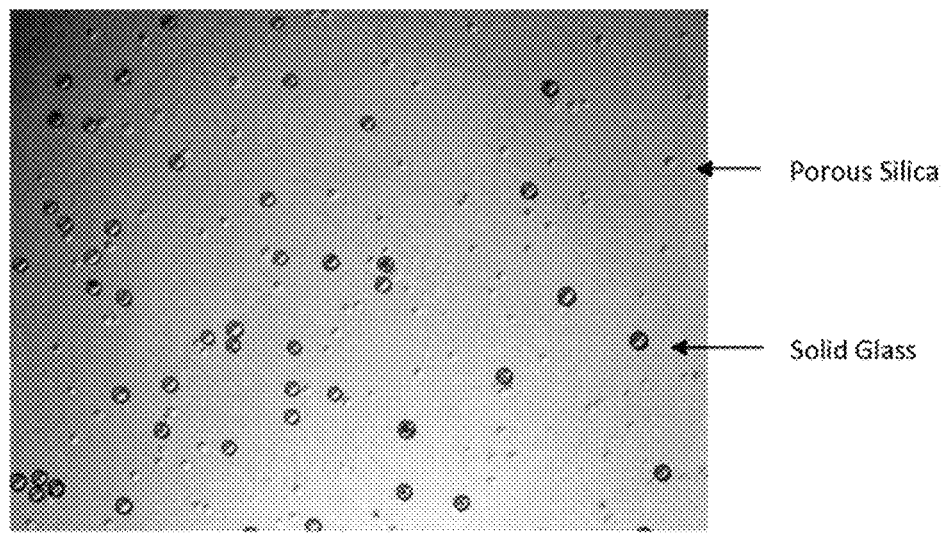
FIG. 3b: A micrograph from an optical microscope showing contrast between a solid glass spacer and a porous glass spacer in a solvent used to prepare electrolyte for use in electrochromic devices.

FIG. 3a shows an optical microscope picture of solid glass spheres (30 µm in diameter as characterized by the manufacturer, Duke Scientific Corporation, Palo Alto, Calif.) and porous silica spheres (15 µm in diameter as characterized by the manufacturer, Silicycle) in propylene carbonate (PC) and placed between two clear glass substrates. The porous spacers had a pore size of 30 nm. The hydrophilicity of the surface (including pore surfaces) was reduced by coating these with C1 as discussed earlier. Propylene carbonate is a fairly typical solvent for preparing electrolytes for electrochromic devices. Since, the solvent wetted and penetrated the porous spheres, these were very difficult to see, whereas the solid spheres were easy to observe. To take these pictures so that the porous spheres can be shown we used illumination from the top and the bottom and then digitally enhanced the contrast. A similar picture was taken where the porous spheres (Silicycle, 15 µm in diameter with 30 nm pore size and coated with C8) were mixed with solid glass spheres which were 30 µm in diameter and the liquid was an electrolyte for EC devices made by mixing ionic liquid (1-butyl-1-methylpyrrolidum bis(trifluoromethanesulfonyl) imide) and the PC (propylene carbonate) in 1:1 by volume ratio and adding 0.05M of Fc-Vio Im dye. Again we had to use the illumination as described earlier and digitally enhance the contrast to be able to show the porous spheres in FIG. 3b. These experiments show that when porous beads are used, the contrast between them and the surrounding fluid decreases due to the penetration of the liquid.

Example 4

EC Device with Porous Spacers

An EC device was made using the electrolyte containing both the ionic liquid and PC and with an electrochromic dye as described in Example 3. Porous spacers were added to the electrolyte which were 15 µm in diameter with 30 nm pore size and all surfaces were coated with C8 coating. The electrolyte with the spacers was sandwiched between two half wave ITO (indium tin oxide) coated glass plates. The ITO resistivity was about 12 ohms/square. 1.3 V was applied to the device after connecting the two conductive coatings with a connector. The device colored with the application of the voltage and then bleached when the power was removed or when the two connectors were shorted. This was done while observing the device under a microscope as in Example 3. The coloring and bleaching was repeated several times, and the device colored uniformly and bleached uniformly. No change in kinetics or coloration non-uniformity was seen in the region of the spacers or around them.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. An electrochromic device wherein the device comprises a rear element coated with a first conductive layer and a transparent front element coated with a second conductive layer wherein the said elements are spaced apart by using at least one of spherical and near spherical spacer beads to define a cavity of a uniform gap such that the first and second conductive layers face the gap and the spacer beads contact the first and second conductive layers, wherein the said cavity is filled by introducing an electrolytic fluid, wherein the said spacer beads have a geometry of a core surrounded by a shell, where the material composition of the shell is different from that of the said core, and the said spacer beads have at least one of the following properties:
   (a) the shell has a lower mechanical modulus than the core;
   (b) the shell is soluble in the electrolyte and the core is not soluble;
   (c) the shell is compatible with the electrolyte and the core is not compatible with the electrolyte;
   (d) the shell is soluble in the electrolyte.

2. An electrochromic device wherein the device comprises a rear element and a transparent front element being sealably bonded together in a spaced apart relationship to define a chamber, and wherein the chamber comprises an electrolyte and spacer beads to hold the spacing between the elements, wherein the said spacer beads are porous spacer beads composed of a first material composition and having pores containing a second material composition, wherein the first and the second material compositions are different, wherein the second material composition is soluble in the electrolyte and the first material composition is not soluble in the electrolyte.

3. An electrochromic device wherein the device comprises a rear element and a transparent front element being sealably bonded together in a spaced apart relationship to define a chamber, and wherein the chamber comprises a liquid electrolyte composition and spherical spacer beads in a size greater than 80 microns to hold the elements at the spaced apart relationship at greater than 80 microns apart, wherein the said spherical spacer beads are porous spherical spacer beads and pores of the said spherical spacer beads are penetrated by the liquid electrolyte composition, and wherein said spherical spacer beads are not soluble in the liquid electrolyte composition.

4. An electrochromic device as in claim 3, wherein porous spacer beads are used, and the surface of the said spacer beads have been treated to reduce hydrophilicity prior to their contact with the electrolyte.

* * * * *